Jan. 13, 1959  J. M. MORGAN, JR  2,868,087
TRACING APPARATUS

Filed Dec. 28, 1954  9 Sheets-Sheet 1

INVENTOR.
JOHN M. MORGAN JR.

BY
DES JARDINS, ROBINSON & KEISER

Howard T Keiser
HIS ATTORNEYS

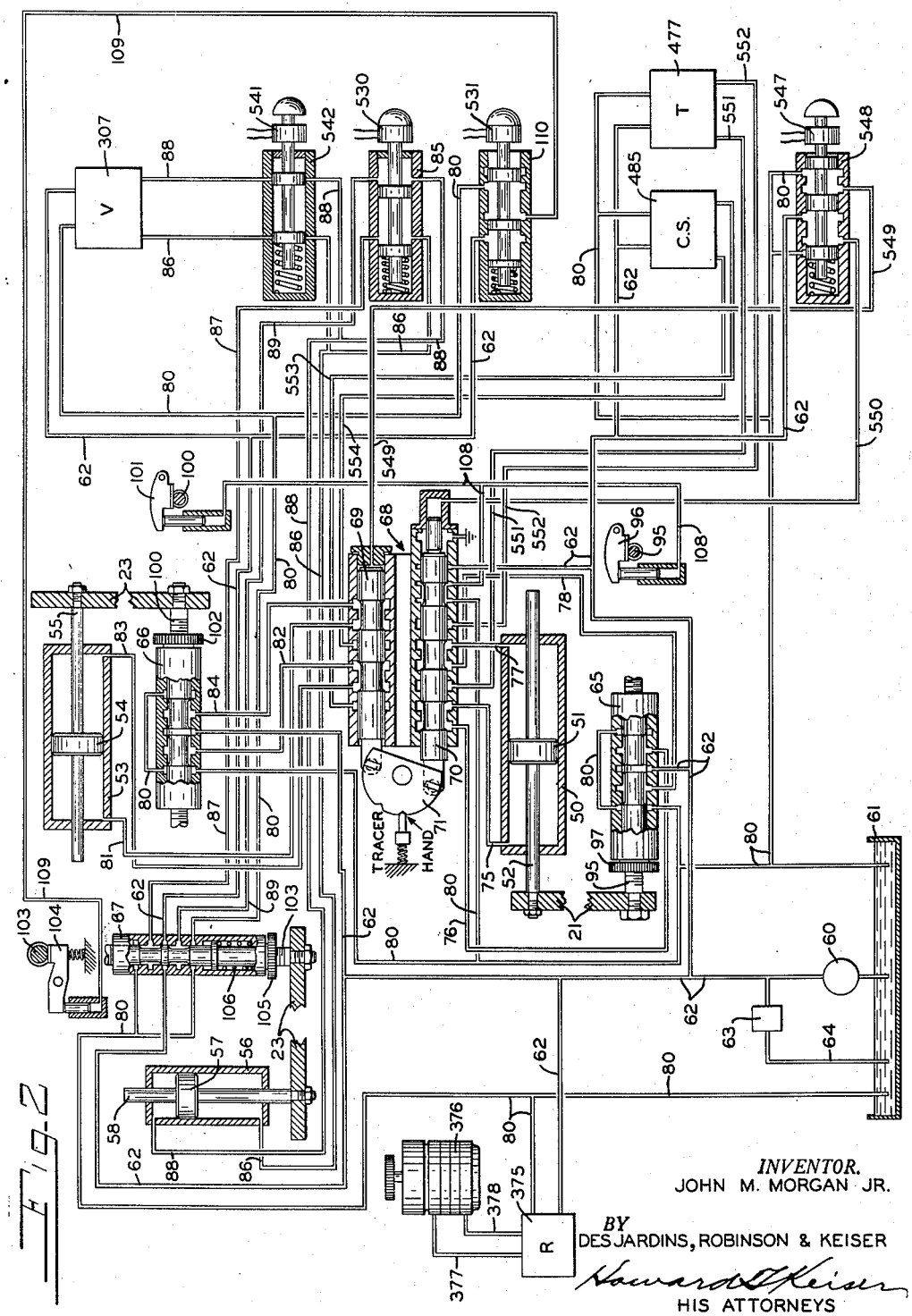

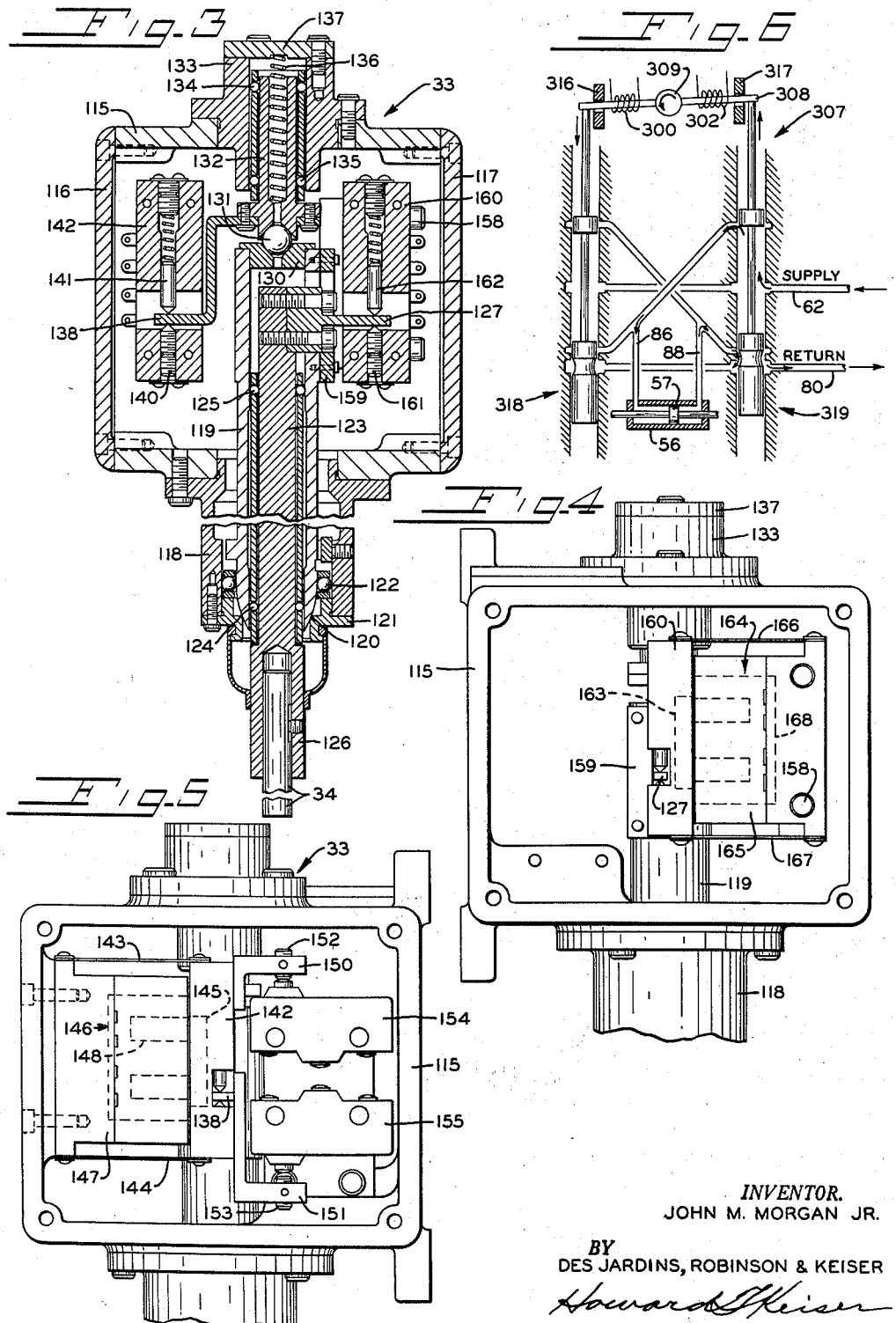

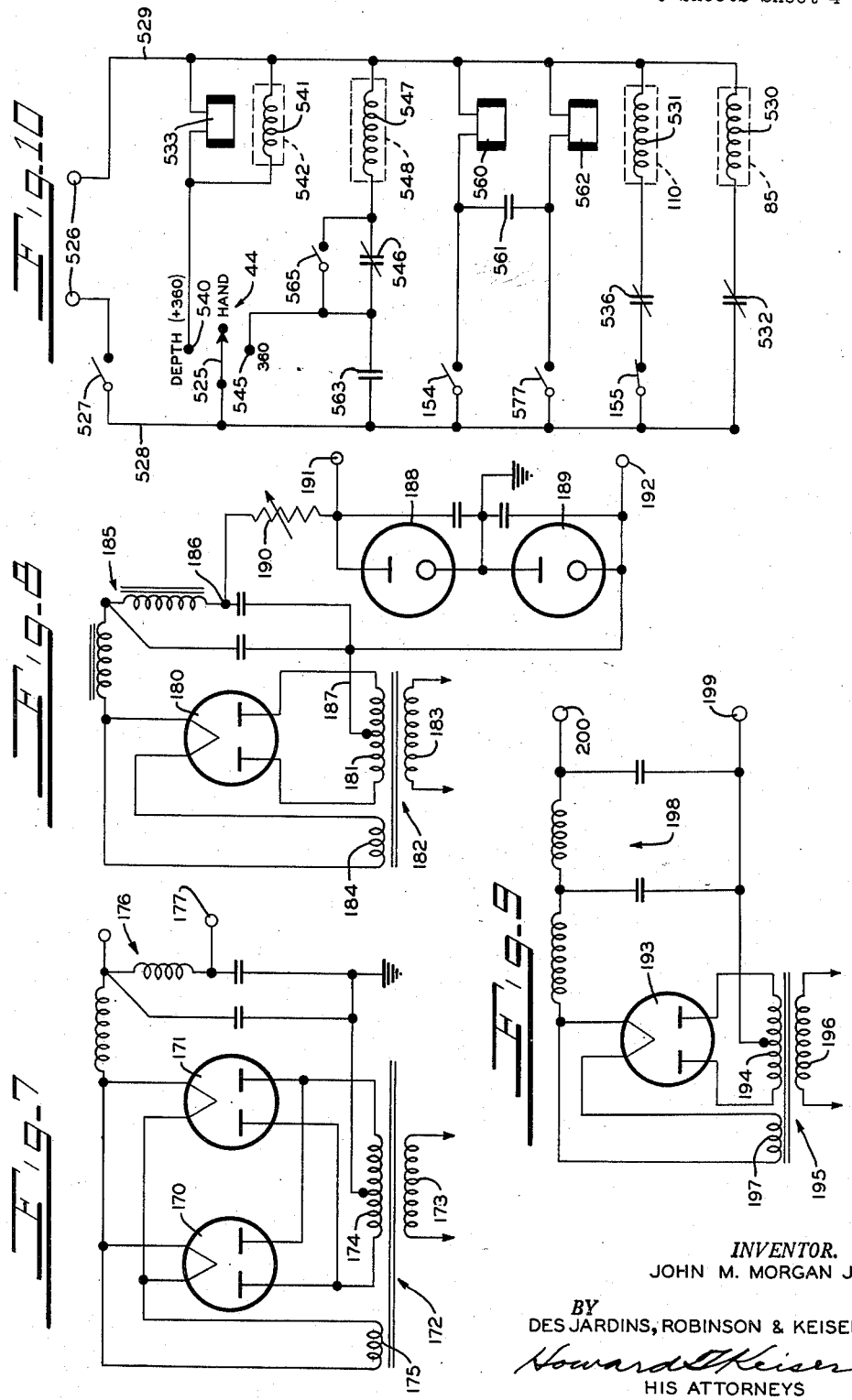

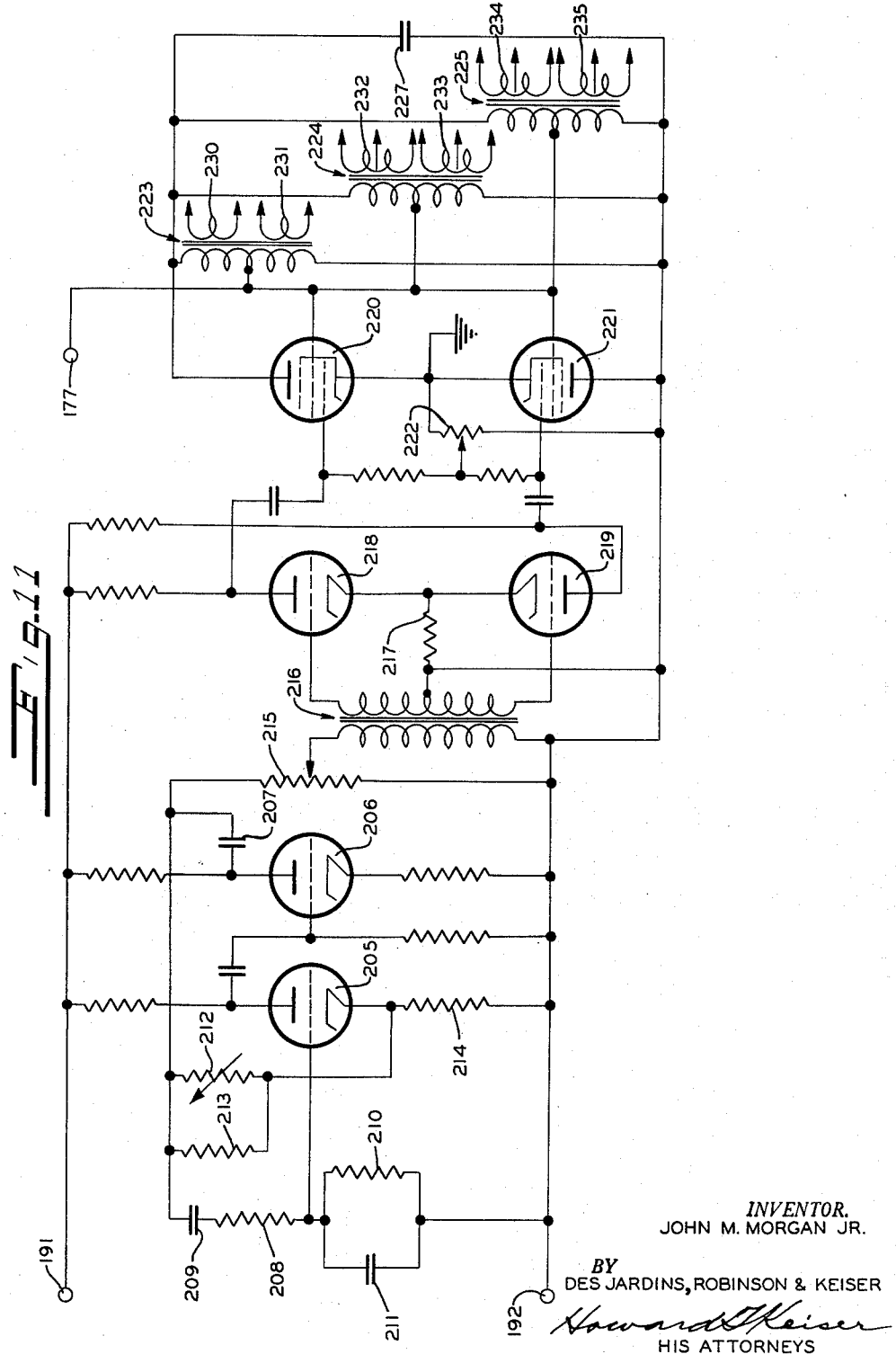

Jan. 13, 1959   J. M. MORGAN, JR   2,868,087
TRACING APPARATUS
Filed Dec. 28, 1954                               9 Sheets—Sheet 6

INVENTOR.
JOHN M. MORGAN JR.
BY
DESJARDINS, ROBINSON & KEISER
HIS ATTORNEYS

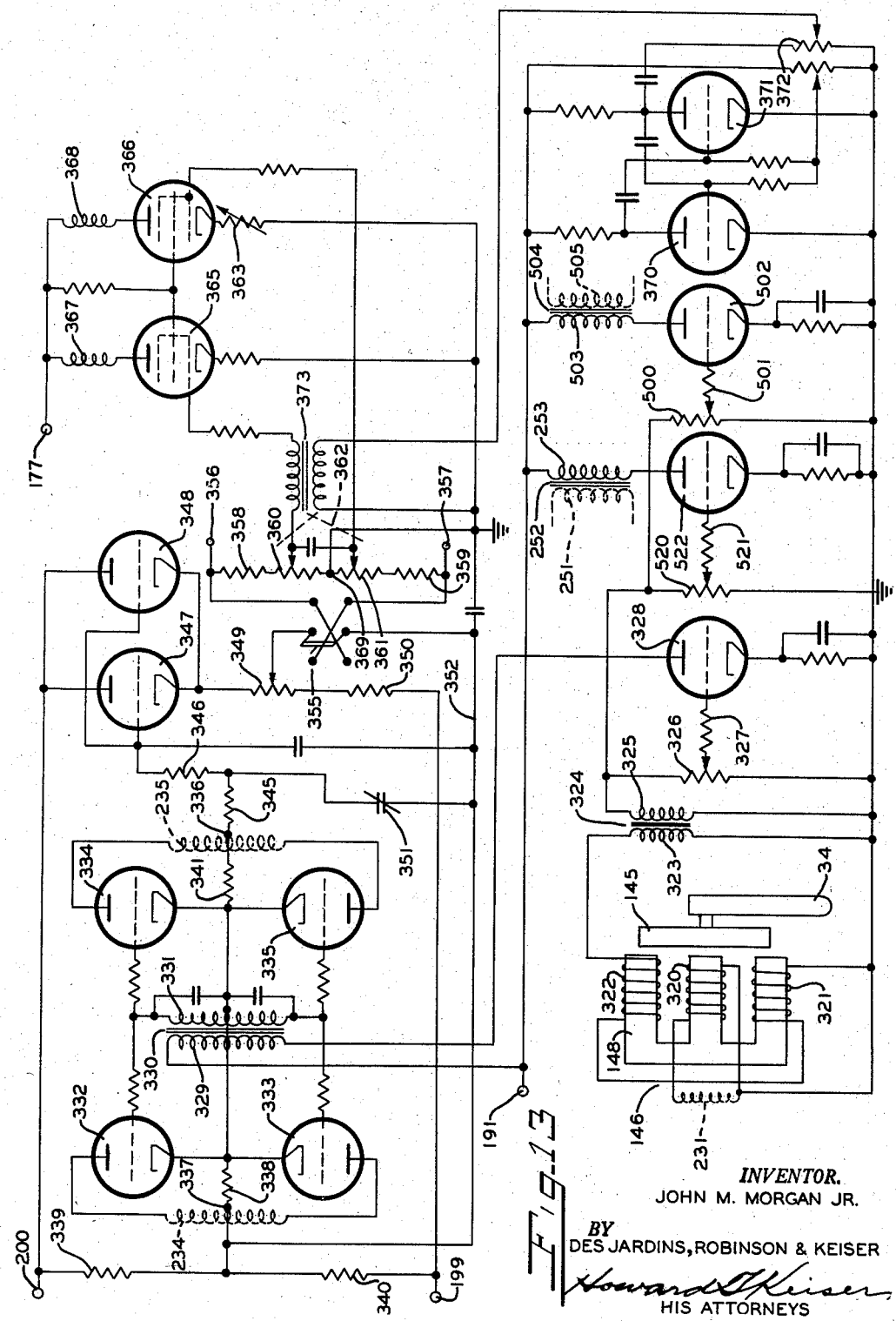

Jan. 13, 1959  J. M. MORGAN, JR  2,868,087
TRACING APPARATUS
Filed Dec. 28, 1954  9 Sheets-Sheet 8
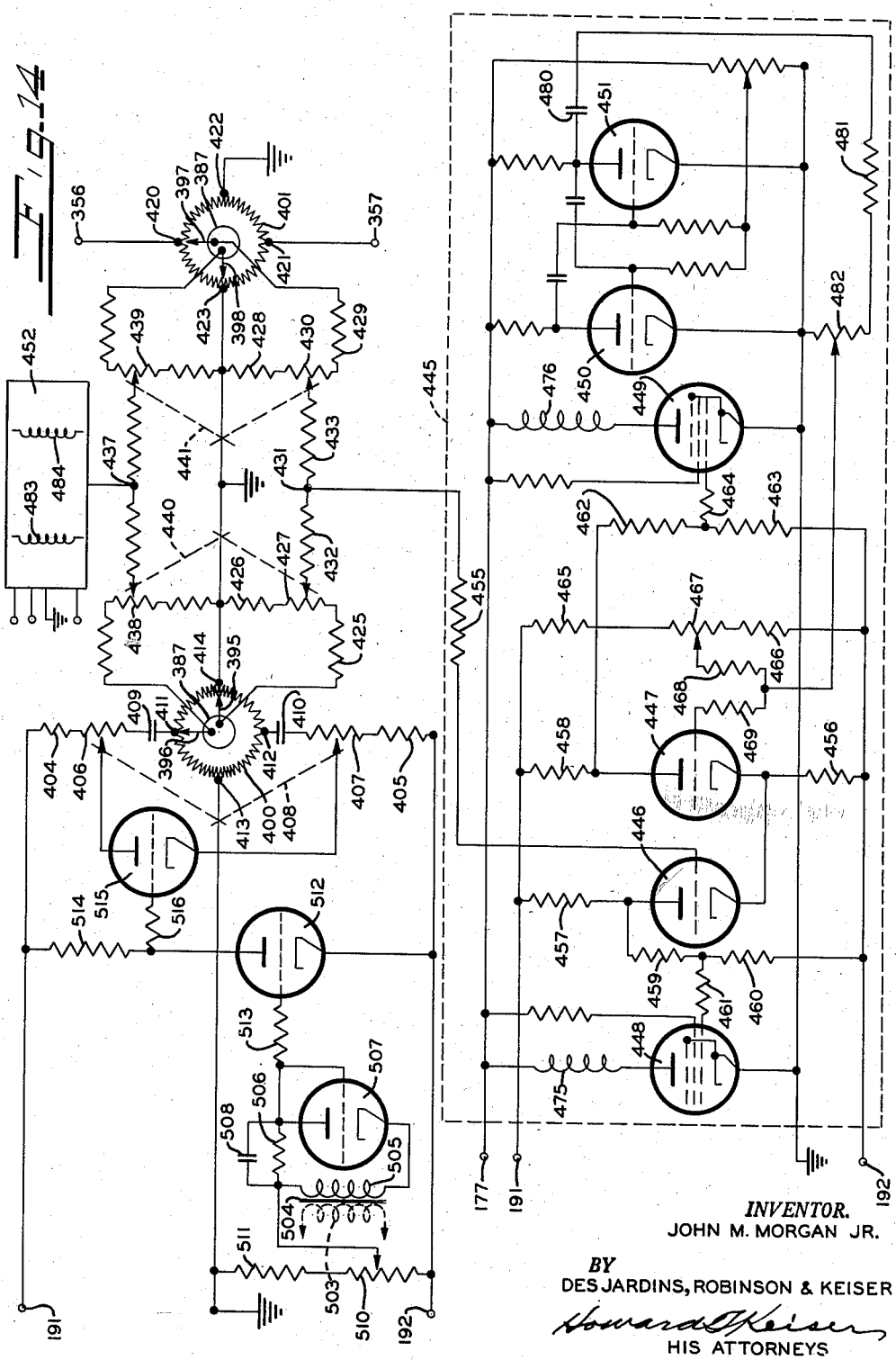
INVENTOR.
JOHN M. MORGAN JR.
BY
DESJARDINS, ROBINSON & KEISER
HIS ATTORNEYS Jan. 13, 1959  J. M. MORGAN, JR  2,868,087
TRACING APPARATUS
Filed Dec. 28, 1954
9 Sheets-Sheet 9
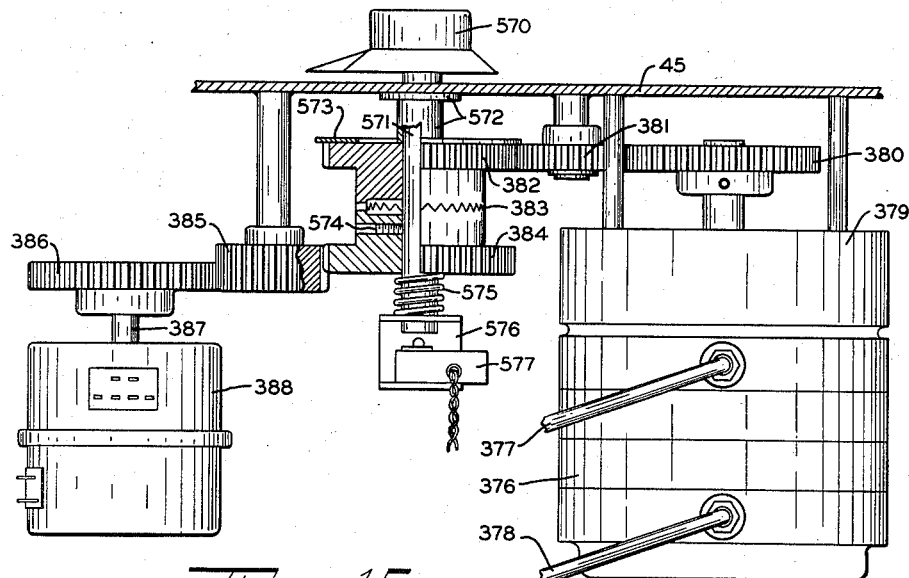
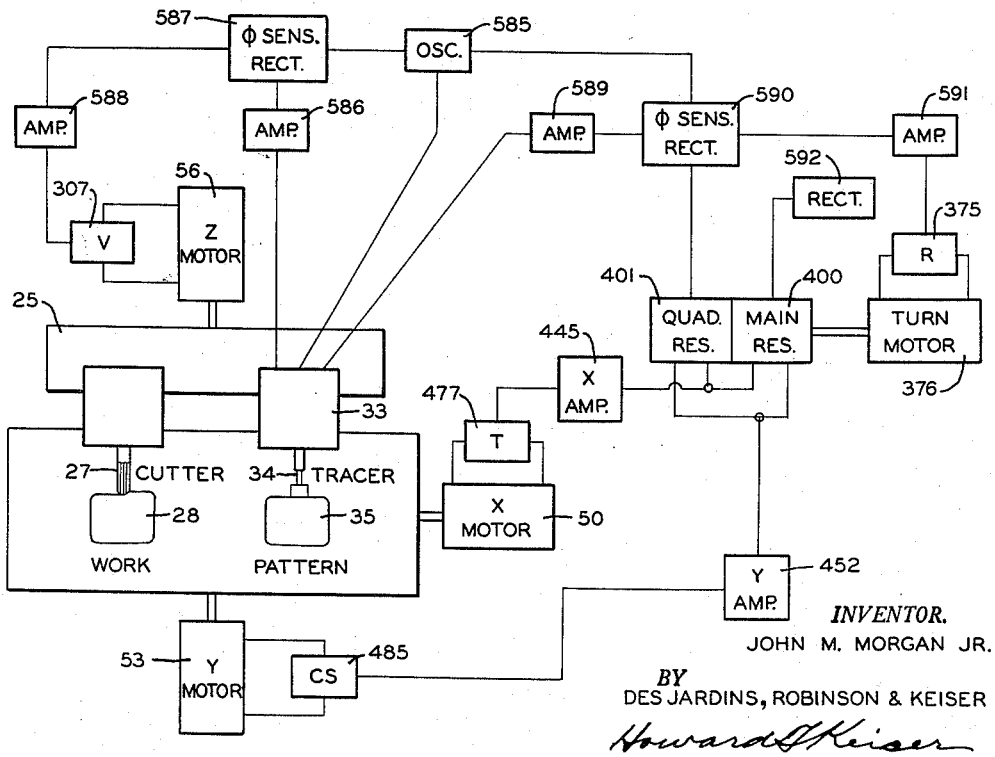
INVENTOR.
JOHN M. MORGAN JR.
BY
DES JARDINS, ROBINSON & KEISER
Howard K Keiser
HIS ATTORNEYS

United States Patent Office 2,868,087
Patented Jan. 13, 1959

2,868,087

TRACING APPARATUS

John M. Morgan, Jr., Montgomery, Ohio, assignor to The Cincinnati Milling Machine Co., Cincinnati, Ohio, a corporation of Ohio Application December 28, 1954, Serial No. 477,976

28 Claims. (Cl. 90—13.5)

This invention relates to a tracer control for machine tools and, more particularly, to a combined electric and hydraulic apparatus for automatically controlling the movement of the cutter of a machine tool with relation to the work so as to cause the latter to be shaped in conformity with the outline of a master or pattern.

Numerous automatic duplicating machines have been marketed in this country and abroad which are electrically driven and electrically controlled. However, these machines have not been entirely satisfactory due to the slow response of the electromechanical components of the control apparatus and the bulk and size of the electrical actuators. In the past, there have also been constructed hydraulically actuated and hydraulically controlled duplicating machines and these, while providing faster and more accurate response to the signals provided by the tracing head have suffered somewhat because of the limited control possibilities of the hydraulic control circuits.

It has long been recognized that important advantages might be obtained by utilizing the best features of both systems in the same machine, that is, by combining the electrical control circuits for the sensing and computing functions of the apparatus with the more rigid and faster acting hydraulic power actuators. However, the solution to the problem of how to combine the two different types of apparatus into one system so as to obtain full advantage of the desirable features of both has been an elusive one. The present patent application is concerned with the solution of this problem and sets forth a simple and practical method of combining the electrical controls with hydraulic driving apparatus so as to provide highly accurate reproductions of the master templet or pattern. In applicant's tracer, an electric, non-directional tracing head is mounted upon one of the slides of the machine tool. This head is provided with a tracing finger which follows the outline of a pattern mounted on a relatively movable portion of the machine. This finger senses changes in the contour of the pattern and transmits an appropriate electric signal to analyzing and control circuits mounted in an electrical cabinet remote from the machine. Control currents produced by these circuits are delivered to electrohydraulic transducers mounted on the machine which, in turn, control the flow of fluid to and from the hydraulic actuators that drive the slides of the machine tool. Steering of the cutter with relation to the work is effected by a direction control device which is settable in accordance with signals received from the tracing head. This device may be mounted in any convenient position on the machine or may be completely removed therefrom. Provision is made for manual setting of the direction control device by suitable manipulation of a hand steering control. The feed rate of the cutter relative to the workpiece may be adjusted to suit the particular requirements of the job and, once adjusted, the feed rate remains uniform in all directions of travel of the cutter relative to the work. Efficient and practical operation of the system is ensured by incorporating in the apparatus certain auxiliary controls which will be described more fully in the detailed description to follow.

Accordingly, it is an object of my invention to provide an automatic reproducing machine in which electrical controls are combined with hydraulic actuators to provide an accurate and efficient machine capable of operating at very high cutting speeds.

Another object of my invention is to provide an electrohydraulic tracer having a non-directional tracing head and a directional steering mechanism which may be located in any convenient position either on or off the machine thereby permitting the operator to be stationed at a distance from the tracing head.

Another object of my invention is to provide an electrohydraulic tracer having a non-directional tracing head adapted to produce an electric error signal whenever the tracer deviates from the pattern outline, and a directional control device for resolving the error signal into components which are applied to the machine controls in such a manner as to return the tracer to the pattern outline.

Another object of my invention is to provide an electrohydraulic tracer having a non-directional tracing head, and a settable device remote therefrom for resolving the error signal from the tracing head into directional components and applying these to the machine controls in such a way as to restore the tracer to the pattern outline, the position of the settable device being adjusted in accordance with the error signal so as to correct the directional heading of the tracer relative to the pattern.

Another object of my invention is to provide, in an electrohydraulic tracer having a non-directional tracing head and a separate, settable device for controlling the steering of the machine, a power means for positioning the settable device in accordance with the error signals produced by the tracing head, and a manipulative device for disconnecting the power means therefrom and for providing hand steering of the machine.

Another object of the invention is to provide certain auxiliary controls for facilitating the operation of the machine.

Another object of the invention is to provide a three-dimensional tracing head having a single tracing finger capable of producing signals which are effective to control the movements of the cutting tool in all directions.

With these and other objects in view which will become apparent from the following description, the invention includes certain novel features of construction and combinations of parts the essential elements of which are set forth in the appended claims, and a preferred form or embodiment of which will hereinafter be described with reference to the drawings which accompany and form a part of this specification.

Referring to the drawings in which like reference numerals indicate like or similar parts:

Fig 2 is a diagrammatic view of the pertinent portions of the hydraulic system of the machine.

Fig. 3 is a cross-sectional elevation of the tracing head viewed from the rear.

Fig. 4 is a left side view of the tracing head with the cover removed.

Fig. 5 is a right side view of the tracing head with the cover removed.

Fig. 6 is a diagrammatic view illustrating the principle of operation of the electrohydraulic tracing valves utilized in connection with my invention.

Fig. 7 is a circuit diagram of one of the power supplies for the electrical control apparatus of the machine.

Fig. 8 is a circuit diagram of a regulated power supply for delivering a constant D. C. voltage to the electrical control apparatus.

Fig. 9 is a circuit diagram of an isolated power supply for the electrical control apparatus.

Fig. 10 is a schematic circuit diagram of the auxiliary control apparatus of the machine.

Fig. 11 is a circuit diagram of a vacuum tube oscillator and amplifier for generating an alternating current of suitable frequency and power for use with the control circuits of the machine.

Fig. 13 is a circuit diagram of a portion of the profile tracing control equipment.

Fig. 14 is a circuit diagram of another portion of the profile tracing control equipment.

Fig. 15 is a front elevation, with parts broken away, of the hand steering device.

Fig. 16 is a schematic view of my electrohydraulic tracer control system.

*Machine tool*

Figure 1:
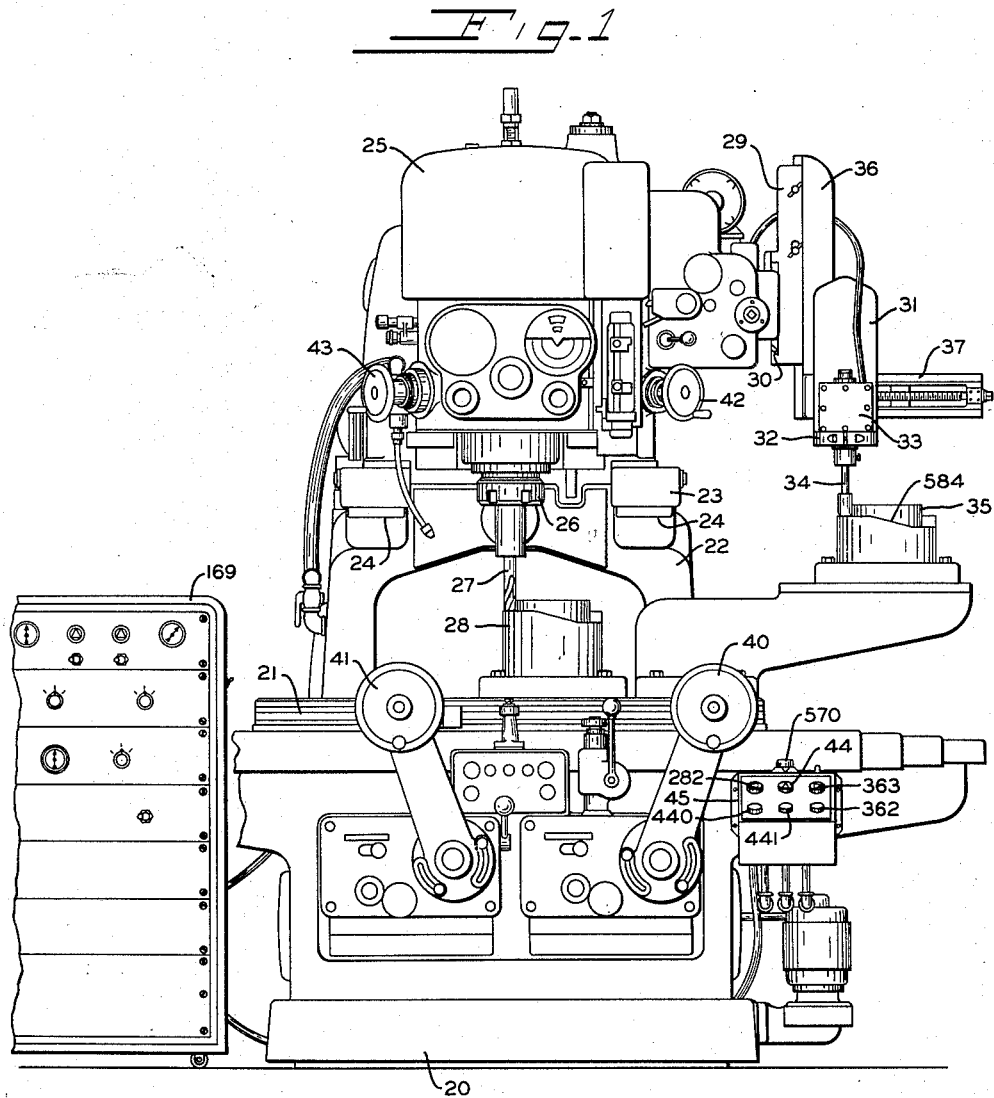
Fig. 1 is a front elevation of a milling machine to which I have applied the tracer control apparatus constituting my invention.

To illustrate the practical application of my invention to a machine tool, I have shown it as applied to a milling machine of the hydraulically actuated type. It is understood, of course, that the principle of the electrohydraulic control device which I have discovered might be used with equally satisfactory results in connection with other types of hydraulically actuated machine tools adapted for reproducing in a workpiece the shape of a master or pattern. The milling machine shown in Fig. 1 comprises a bed 20 on which a work table 21 is mounted for longitudinal sliding movement. Supported on the bed behind the table 21 is a column 22 on which a cross slide 23 is mounted for horizontal sliding movement along ways 24 in a fore and aft direction, that is, at right angles to the direction of movement of the table 21. A tool head 25 carrying a power driven spindle 26 and milling cutter 27 is mounted for vertical sliding movement on the cross slide 23 so as to provide three dimensional movement of the cutter relative to a workpiece 28 mounted on the table. On the right-hand side of the head 25 is mounted a saddle 29 which is supported for horizontal sliding movement in a fore and aft direction on the head by suitable ways 30. The saddle 29 is provided with vertical ways on which a saddle 36 is mounted for vertical sliding movement. The saddle 36 is provided with a horizontal arm 37 on which a tracing head slide 31 is mounted for movement in a horizontal direction. The slide 31 has a horizontal extension 32 on which a tracing head 33 is supported so that a tracing finger 34 depending therefrom will move in unison with the cutter 27 and follow the contour of a pattern 35 fastened to the table. Also, by virtue of this particular mounting of the tracing head 33 upon the tool head 25, the tracing finger 34 may be adjusted in any direction with respect to the cutter 27 for setup purposes.

The milling machine herein illustrated is of the same general type as that shown in U. S. Patent No. 2,239,625 issued April 22, 1941 to Erwin G. Roehm and Hans Fritschi and, like the machine of that patent, is provided with means for enabling hand operation of the table, cross slide and head. As shown herein in Fig. 1, a hand wheel 40 is mounted on the front of the machine bed in a convenient position for manual operation to cause traversing movement of the table 21. Movement of the table is effected hydraulically by a hand servovalve, the plunger of which is moved in one direction or the other in accordance with the direction of rotation of the hand wheel 40. The valve plunger is connected with the hand wheel 40 by means of suitable gearing and a half nut operating on a feed screw in the manner described in the aforementioned patent. In a similar manner, the cross slide 23 may be caused to move back and forth along the ways 24 by suitable manipulation of a hand wheel 41 also mounted on the front of the bed 20. Vertical movement of the tool head 25 may be effected in a corresponding manner by manipulation of a hand wheel 42, or a hand wheel 43, which hand wheels are geared together for conjoint rotation. When the machine is set for automatic tracing by manipulation of a selector switch 44 mounted in a control box 45 fastened to the front apron of the machine, the manual controls are selectively rendered ineffective to prevent misoperation of the machine when under the control of the tracer.

*Hydraulic circuits*

The hydraulic actuating and control apparatus of the milling machine shown in Fig. 1 is illustrated diagrammatically in Fig. 2 of the drawings. As therein shown, the hydraulic actuator of the table 21 comprises a hydraulic cylinder 50 containing a piston 51 mounted on the piston rod 52 which is bolted to the table 21. The table may be moved in either direction by selectively controlling the admittance of fluid under pressure to either end of the cylinder 50. The cross slide 23 is operated by a similar hydraulic actuator consisting of a cylinder 53, piston 54 and piston rod 55 bolted to the cross slide. In a like manner, the tool head 25 may be caused to move up or down on the cross slide by means of a hydraulic cylinder 56 secured to the head and containing a piston 57 mounted on a piston rod 58 which is bolted to the cross slide 23.

Hydraulic fluid under pressure is supplied to the above-mentioned actuators by means of a pump 60 which draws fluid out of the sump 61 and delivers it under pressure to a system of high pressure lines 62. Pressure in the lines 62 is maintained constant under varying demands on the system by a pressure relief valve 63 connected to the pressure side of the pump 60 and having a discharge line 64 emptying into the sump 61.

The flow of high pressure fluid to the cylinders 50, 53 and 56 is controlled by hand servovalves 65, 66 and 67, respectively, when a selector valve 68 is set in the "Hand" position as shown in Fig. 2. The valve 68 includes a pair of valve plungers 69 and 70 which are connected together for conjoint operation by means of a centrally pivoted lever 71 to which the ends of the plungers are pivotally connected. Hence, when plunger 69 is moved to the left as viewed in Fig. 2, the plunger 70 will be moved to the right, and vice versa. With the selector valve 68 positioned as shown, the left-hand end of the cylinder 50 is communicatively connected with the right-hand motor port of valve 65 by lines 75 and 76. In a like manner, the right-hand end of the cylinder 50 is communicatively connected with the left-hand motor port of valve 65 by lines 77 and 78. The center, or pressure, port of the valve 65 is, of course, connected to the system of high pressure lines 62 and the exhaust ports of the valve are connected to a system of drain lines 80 through which the hydraulic fluid is returned to the sump 61.

In a like manner, the hand servovalve 66 for the cross slide cylinder 53 will be effective to control the flow of fluid to and from its associated cylinder when the selector valve 68 is in the position shown. In this position of the valve, the left-hand end of cylinder 53 is communicatively connected with the right motor port of valve 66 by lines 81 and 82. Likewise, the right-hand end of the cylinder is connected to the left motor port by lines 83 and 84. The center, or pressure, port of the valve is connected to the high pressure lines 62 and the exhaust ports are connected to the drain line 80.

The hand servovalve 67 is effective to control the flow of hydraulic fluid to and from the head cylinder 56 upon energization of a solenoid blocking valve 85. This valve is shown in its energized position in Fig. 2. The means for controlling the energization and deenergization of valve 85 will be fully described in a subsequent portion of this specification and for the present it will suffice to say that the valve 85 is energized whenever the tool head 25 is conditioned for hand operation. Under these circumstances, the lower end of the cylinder 56 will be communicatively connected with the upper motor port of the valve 67 by means of lines 86 and 87. At the same time, the upper end of the cylinder will be communicatively connected with the lower motor port of the valve by means of lines 88 and 89. The center port of the valve is connected to the high pressure line 62 and the exhaust ports of the valve are connected to the drain line 80.

From the foregoing it will be clear that when the machine is set for hand operation, the hand servovalves 65, 66 and 67 will be effective to control the flow of fluid under pressure to and from the cylinders of the hydraulic actuators. Direction of movement of the pistons within the cylinders will be dependent upon the direction of movement of the plungers of the valves which, in hand operation of the machine, is effected by hand wheels 40, 41 and 42 or 43 (Fig. 1) which are connected through gearing with half nuts moving with the valve plungers. This mechanism is fully described in the earlier mentioned U. S. Patent No. 2,239,625 and will not be described in detail here except insofar as is necessary to an understanding of the manner in which changeover is effected from hand servo control to tracer control.

Referring to Fig. 2 the plunger of the hand servovalve 65 is bored to slidably receive a feed screw 95 which is bolted to the table 21. As diagrammatically illustrated herein, the feed screw 95 is adapted to be engaged by a half nut 96 which is carried by and moves with the plunger of the valve and is pivoted thereto for movement into or out of engagement with the feed screw 95. As described in the aforementioned patent, the plunger and half nut may be rotated by means of a gear 97 connected to the hand wheel 40 for rotation thereby. Hence, with the half nut engaged with the feed screw 95, rotation of the plunger and half nut will cause the plunger to be fed along the screw thereby admitting fluid under pressure to one end of the cylinder 50 and connecting the other end of the cylinder to drain. The resulting movement of the piston 51 will cause movement of the table 21 which in turn will center the plunger of the valve to stop further movement, the body of the valve being fast on the bed of the machine. When the half nut is disengaged from the feed screw, however, the table will then be free to move with reference to the valve plunger as is necessary in operating the machine under tracer control.

The hand servovalve 66 for the cross slide cylinder 53 is constructed and arranged in the same manner as the valve 65 just described. That is, the plunger of the valve is bored to slidably receive a feed screw 100 which is bolted to the cross slide and adapted to be engaged by a half nut 101 pivotally supported on the plunger of the valve. Rotation of the plunger and half nut may be effected by manipulation of hand wheel 41 (Fig. 1) which is connected by suitable gearing with a gear 102 rotating with the plunger. Hence, the cross slide may be moved back and forth under power by suitable manipulation of the hand wheel 41 which, when the half nut 101 is engaged, causes feeding movement of the plunger of the valve along the feed screw and corresponding movement of the cross slide while the hand wheel is being turned.

The servovalve 67 for the head cylinder 56 is similarly constructed. The plunger of this valve is bored to slidably receive a feed screw 103 which is adapted to be engaged by a half nut 104 pivotally supported on the valve plunger. Rotation of the plunger and half nut by hand wheels 42 and 43 is effected by a suitable drive from the hand wheels to a gear 105 which rotates with the plunger of the valve. Therefore, with the half nut engaged, rotation of the hand wheels will cause feeding movement of the plunger along the feed screw and cause corresponding movement of the cylinder 56 relative to the cross slide 23. For reasons later to be explained, the plunger of the valve 67 is biased upwardly by a spring 106 compressed between an offset in the valve body and a flange formed on the valve plunger. So long as the half nut 104 is engaged with the feed screw 103, however, the spring 106 is ineffective to move the valve plunger out of its centered position.

Each of the half nuts 96, 101 and 104, is normally biased into engagement with its related feed screw but may be disengaged therefrom upon the application of hydraulic pressure to a small hydraulic actuator associated with each half nut. As shown in Fig. 2, the hydraulic actuators for the half nuts 96 and 101 are connected by a line 108 with a port on the selector valve 68. This port is connected with the drain line 80 when the plunger 70 is in the position shown in Fig. 2. Hence, when the selector valve is set for hand servo operation, the half nuts will be engaged with their related feed screws. The hydraulic actuator for the half nut 104 is connected by a line 109 with a port on a solenoid valve 110. In hand servo operation, this valve is normally energized, as shown in Fig. 2, to connect the line 109 with the drain line 80 connected to another port on the valve. Accordingly, the half nut 104 will be permitted to engage with its feed screw 103 to enable hand operation of the tool head.

Tracing head

When the machine which has been heretofore described is to be used for the automatic reproduction of a master or pattern, it is placed under the control of the tracing head 33 whose finger 34 follows the outline of the pattern 35 to be reproduced. As shown in Figs. 3, 4 and 5 of the drawings, this head is housed in a box like casing 115 having a pair of removable cover plates 116 and 117 for enclosing the right and left sides thereof, respectively. Secured to the bottom of the casing is a cylindrical housing 118 in which is received the lower end of a sleeve 119. This sleeve is supported at its lower end within the housing 118 by a shoulder 120 formed on a cap 121 secured to the bottom end of the housing, and also by a ball bearing 122 resting on top of the cap 121. Lying within the sleeve 119 is a tracing finger plunger 123 which is mounted for longitudinal sliding movement within the sleeve by ball bearings 124 and 125. At its lower end, the plunger 123 is provided with a chuck 126 for holding the tracing finger 34, while at its upper end, the plunger is fitted with a lateral extension 127 which projects out of a slot provided in the sleeve 119.

The upper end of the sleeve 119 is fitted with a cap 130 provided with a conical seat in which is received a ball 131. Resting on the top of the ball 131 is a sleeve 132 which, like the cap 130 is formed with a conical seat for engaging the ball 131. The sleeve is mounted for axial sliding movement within a cylindrical bore provided in a bushing 133 received in an aperture provided in the top of the casing 115. The sleeve 132 is guided for sliding movement within the bushing by means of ball bearings 134 and 135 and is spring urged downwardly into contact with the ball 131 by a compression spring 136 lying inside the sleeve and bearing against a cover 137 fastened to the top of the bushing. Secured to the lower end of the sleeve 132 is an offset lateral extension 138 which will occupy its lowermost position when the tracing finger 34 is in its undeflected, or Fig. 3, position. However, any sidewise pressure applied against the finger 34 will cause the sleeve 119 to be rocked about its base and result in raising the sleeve 132 and extension 138.

As shown in Fig. 3, the extension 138 is connected to an armature carrier 142 so as to cause the carrier to partake of its up and down movement in response to sidewise movement of the tracing finger. The connection between the extension and carrier includes a pointed screw 140 threaded into a hole in the bottom of the carrier, and a spring pressed plunger 141, also pointed, which bears against the upper face of the extension and maintains it in contact with the pointed end of screw 140. The carrier 142 is made of non-magnetic material and carries a soft iron armature 145 (Fig. 5) which, together with an E-magnet 148, forms a differential transformer 146. The E-magnet is mounted in a holder 147 which is screwed fast to the casing 115 while the carrier is supported for vertical movement by a pair of reeds 143 and 144 fastened to the holder 147. In Fig. 5 the carrier is shown in the position which it occupies when the tracing finger is undeflected wherein there is a greater overlap of the bottom pole than of the upper pole by the armature. When the tracing finger 34 is deflected sufficiently to equalize the overlap of the armature 145 with the poles of the E-magnet 148, the magnetic circuit of the transformer will be balanced and, as described later herein, the error signal from the tracing head will be zero. This, then, will represent what may be termed the "normal" or "null" position of the tracing finger 34.

The carrier 142 also carries upper and lower brackets 150 and 151, respectively, the laterally extending arms of which are fitted with adjustment screws 152 and 153, respectively. The adjustment screws are adapted to cooperate with the operating buttons of a pair of normally closed limit switches 154 and 155 supported on the casing 115. When the carrier 142 is in the position shown in Fig. 5, that is, in the position it occupies when the tracing finger 34 is undeflected, the adjustment screw 152 will hold the contacts of the switch 154 open but will permit them to close upon slight upward movement of the carrier resulting from initial deflection of the finger 34 by the pattern. Adjustment screw 153 is spaced a sufficient distance from the operating button of switch 155 so as not to become effective to open the contacts of the switch until the carrier has been moved upwardly to a considerable degree. The functions of the limit switches 154 and 155 will be described in the section of this specification relating to auxiliary controls.

The extension 127 carried by the plunger 123 (Fig. 3) is adapted to control the movement of an armature carrier 160 which, like the carrier 142 is connected with the extension by a screw 161 engaging with the bottom of the extension and a spring pressed pin 162 engaging with the top of the extension. The carrier will thereby be constrained to follow the movements of the extension 127 which moves up and down in response to vertical movement of the tracing finger 34.

The carrier 160 is constructed of non-magnetic material and has embedded therein a soft iron armature 163 (Fig. 4) which lies adjacent the pole faces of an E-magnet 168 of a differential transformer 164. The E-magnet is mounted in a holder 165 supported on the sleeve 119 by a bracket 159 pinned to the sleeve to which the holder is fastened by screws 158, while the carrier 160 is supported for translational movement by a pair of reeds 166 and 167 which are attached to the holder 165. In Fig. 4 the carrier 160 is shown in the position it occupies when the tracing finger 34 is in its lowermost position. When the carrier is in this position, the armature 163 lies below its centered position with respect to the poles of the E-magnet 168. The carrier is urged toward this position by the force of gravity acting on the plunger 123 which biases it toward the position shown in Fig. 3 where the bottom edge of the piece on which the extension 127 is formed lies against the bottom edge of the slot formed in the sleeve 119. This defines the lowermost position of the plunger and upward pressure on the bottom of the tracing finger 34 will be effective to raise the plunger and move the armature 163 upwardly toward the centered position with respect to the poles of the E-magnet 168.

From the foregoing it will be noted that the tracing head 33 is sensitive both to sidewise deflection of the tracing finger 34, which causes vertical movement of extension 138, and also to vertical displacement of the finger, which causes vertical movement of the extension 127. Hence, the tracing head is of a three dimensional character, the extension 138 responding to horizontal deflections of the tracing finger from any direction within a full 360°, and the extension 127 responding to vertical deflections of the tracing finger. It will also be observed that the tracing head is of a non-rotational type, the tracing finger being non-rotatable with respect to the casing 115 and the casing being fast on the adjustable support carried by the tool head 25. The tracing head is therefore non-directional in character, the finger 34 responding to deflections within a full 360° in a horizontal direction to raise the ball 131 and the extension 138.

*Power supplies*

The differential transformers 146 and 164 constitute electrical pickups from which signals are obtained indicating deviations of the tracing finger from its normal or null position. In accordance with my invention, the signals from the pickups are amplified and analyzed by suitable electronic control apparatus, housed in a cabinet 169 (Fig. 1), by which control currents are applied to electromagnetic valves which control the flow of hydraulic fluid to and from the hydraulic actuators of the milling machine. To provide a suitable supply of direct current for the electronic control apparatus of the machine, the power supplies shown in Figs. 7, 8 and 9 are provided. In Fig. 7 is shown a full-wave rectifier of conventional design and employing two full-wave rectifier tubes 170 and 171 connected in parallel for increased current handling capacity. Alternating current is supplied to the plates of the tubes by a power transformer 172 having a primary winding 173 adapted for connection to an alternating current power line. The plates of the tubes are connected to the end terminals of a center-tapped secondary winding 174, the center tap of which is connected to ground. The filaments of the tubes are heated by a filament winding 175 of the transformer 172. An inductance-capacitance filter 176 is connected between the filaments and ground so as to smooth the ripple in the output current and provide a source of steady, direct current voltage between the positive terminal 177 and ground.

In Fig. 8 of the drawings is shown a vacuum tube full-wave rectifier for supplying a regulated direct current output to the load circuit. This power supply includes a full wave rectifier tube 180, the plates of which are connected to the end terminals of a secondary winding 181 on a power transformer 182 having a primary winding 183 adapted for connection to an alternating current power line. A filament winding 184 on the transformer 182 provides heating current for the filament of the tube and an inductance-capacitance smoothing filter 185 is connected between the filament and the center tap lead 187. A regulated output is obtained by means of voltage regulator tubes 188 and 189 which, together with a rheostat 190 are connected in series across the output terminals of the rectifier. The connection between the tubes 188 and 189 is grounded so as to cause the output voltage appearing across the terminals 191 and 192 to be positive and negative, respectively, with respect to ground. The amount of current flowing through the regulator tubes may be adjusted by manipulation of the rheostat 190.

A further source of direct current voltage is supplied by the isolated power supply shown in Fig. 9. This supply includes a full-wave rectifier tube 193 whose plates are supplied with alternating current from a center-tapped secondary winding 194 of a transformer 195. The primary winding 196 of the transformer is adapted for connection to an alternating current power line and the transformer is provided with a filament winding 197 which provides heating current for the filament of tube 193. The output is filtered by an inductance-capacitance filter 198 to provide a source of steady direct current between negative terminal 199 and positive terminal 200. This power supply is ungrounded for reasons which will appear hereinafter.

To provide a source of alternating current of a suitable frequency for operating the differential transformers or pickups 146 and 164, a vacuum tube oscillator is provided as shown in Fig. 11. This oscillator, which in the present example is of the Wien-bridge type, is provided with power from the regulated supply terminals 191 and 192 (Fig. 8) and includes a vacuum tube 205 the output from which is inverted and amplified by vacuum tube 206. The output from tube 206 is fed back to the input of tube 205 by a coupling condenser 207. The feedback voltage is passed through a frequency discriminating network including series-connected resistor 208 and condenser 209, and parallel-connected resistor 210 and condenser 211. The values of these components are so chosen as to favor a frequency of 1000 cycles per second and thereby cause the circuit to oscillate at this frequency. A degenerative feedback voltage is applied to tube 205 by a voltage divider consisting of cathode resistor 214, rheostat 212, and resistor 213. The amount of negative feedback may be controlled by manipulation of rheostat 212 so as to maintain the amplitude of output from tube 205 at a low enough level to ensure that the wave form will be approximately sinusoidal.

A potentiometer 215 connected in the output circuit of the oscillator enables a predetermined portion of the 1000 cycle signal from the bridge to be applied to a two-stage, push-pull amplifier which provides the power necessary for operating the pickups and the phase-sensitive rectifiers later to be described. As shown in Fig. 11, the slider of the potentiometer is connected to the primary winding of a transformer 216 the secondary winding of which is provided with a center tap connected through a cathode biasing resistor 217 to the cathodes of vacuum tubes 218 and 219. The grids of the tubes are connected to the end terminals of the secondary winding of the transformer, the plates of the tubes being connected to the B+ voltage terminal 191 through suitable load resistors. The output from the tubes 218 and 219 is suitably coupled to the input of a pair of power amplifier tubes 220 and 221, the grids of which are biased by a source of negative voltage derived from a potentiometer 222 connected between negative supply terminal 192 and ground. The plates of tubes 220 and 221 are supplied with B+ voltage from source 177 (Fig. 7) which feeds the plates through center tapped primary windings of transformers 223, 224 and 225. As shown in the drawing, the three primary windings are connected in parallel so as to provide parallel feed to the plates of the tubes 220 and 221 and each transformer is provided with a pair of secondary windings from which alternating current power of the frequency produced by the oscillator may be derived. A small condenser 227 is connected between the plates of the power output tubes to bypass any parasitic frequencies appearing in the output. The transformer 223 is provided with a pair of secondary windings 230 and 231; the transformer 224 is provided with a pair of center tapped secondary windings 232 and 233; and the transformer 225 is provided with a pair of center tapped secondary windings 234 and 235.

*Depth control*

Figure 12:
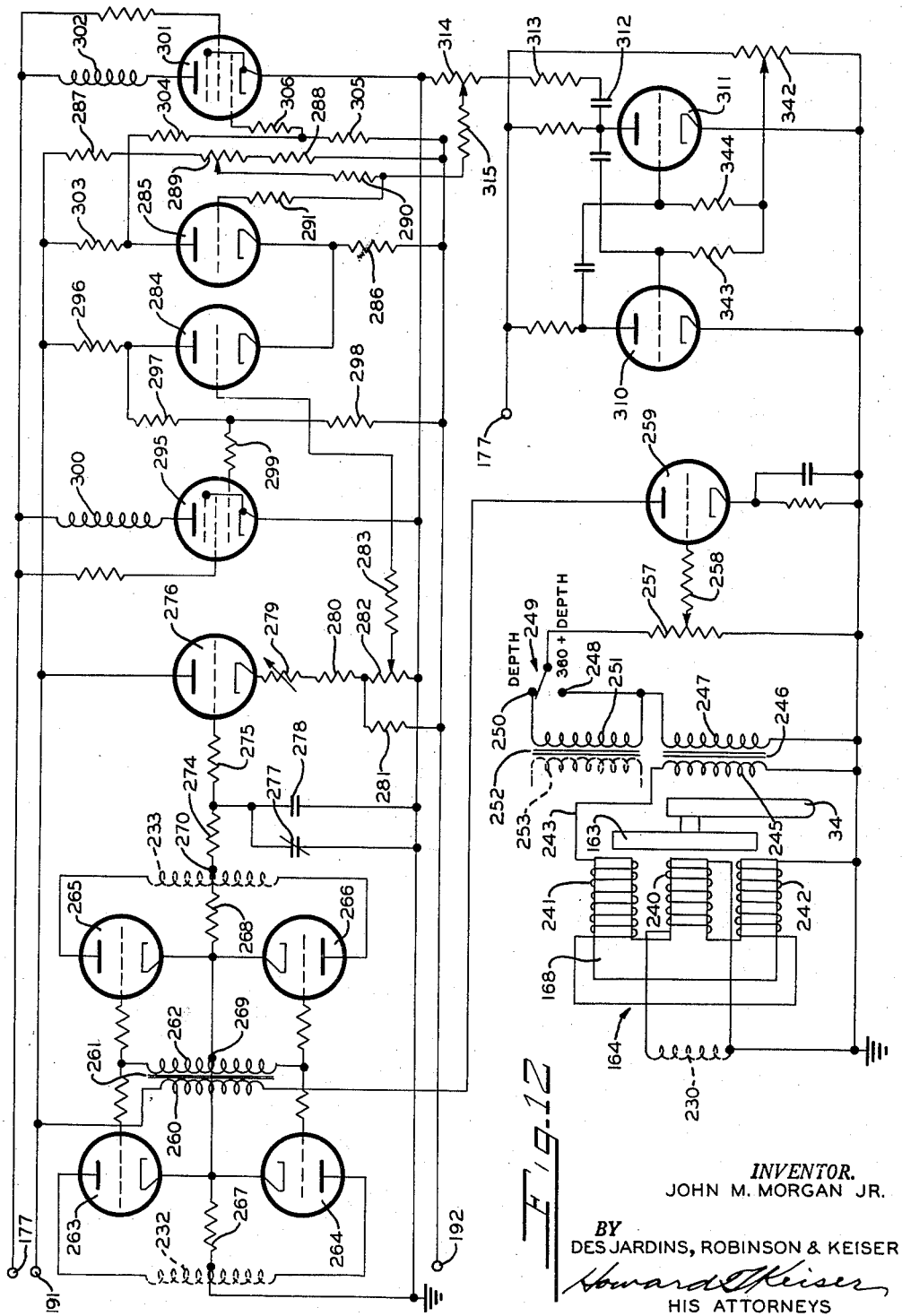
Fig. 12 is a circuit diagram of the depth tracing control equipment.

The tracing control apparatus shown in the accompanying drawings is designed to provide three dimensional control of the cutter relative to the work. In other words, the cutter may be guided for 360° movement relative to the work in a horizontal plane and may also be guided for movement perpendicular to the work in a vertical direction. The latter movement of the cutter is controlled by the depth pickup which comprises the differential transformer 164 whose armature 163 is caused to follow vertical movements of the tracing finger 34 as this finger is caused to move up and down by undulations of the pattern in a vertical direction. As shown in Fig. 12, the E-magnet 168 of transformer 164 is provided with a center leg winding 240 which is provided with 1000 cycle alternating current from the secondary winding 230 (Fig. 11) on transformer 223. The outer legs of the E-magnet are provided with windings 241 and 242 which are connected in series between ground and an output lead 243. The windings 241 and 242 are connected in phase opposition, that is, when the armature 163 is centered, equal and opposite voltages will be induced in the secondary windings 241 and 242 so that the output from the transformer via lead 243 will be zero. If the armature 163 is below center so that the overlap at the lower end of the armature is greater than at the upper end, then the flux through the lower pole of the transformer will be greater than that through the upper pole and the output from secondary winding 242 will predominate over that from winding 241. Conversely, if the armature 163 is raised above its centered position, the voltage output from winding 241 will predominate over that from 242 so that a voltage of opposite phase will be delivered through the output lead 243.

As shown in Fig. 12, the output lead 243 is connected to one end of a primary winding 245 of a transformer 246, the other end of the primary winding being grounded. The transformer is provided with a secondary winding 247 one end of which is grounded and the other end of which is connected to a contact terminal 248 of a single pole, double throw switch 249. As shown, this switch is provided with a second contact terminal 250 which is connected to one end of a secondary winding 251 of a transformer 252 the primary winding 253 of which is connected in a circuit subsequently to be described. The other end of the secondary winding 251 is connected to the contact terminal 248. The blade of switch 249 is connected to one end of a potentiometer 257 the other end of which is connected to ground. The slider of the potentiometer is connected through a grid resistor 258 to the grid of an amplifier tube 259. The plate of this tube is connected through a primary winding 260 of a transformer 261 to the positive voltage source 191 (Fig. 8). Hence, signals produced by the pickup 164 will be amplified by the tube 259 and applied to the primary winding 260 of transformer 261. The primary winding 260 serves as the input to a phase-sensitive amplifying rectifier comprised of vacuum tubes 263, 264, 265 and 266. Transformer 261 is provided with a center tapped secondary winding 262. One terminal of this winding is connected to the grids of tubes 263 and 265 through appropriate grid resistors, and the other end of the winding is connected to the grids of tubes 264 and 266 through similar resistors. The center tap 269 of the secondary winding is connected to all four cathodes of the tubes. The plates of tubes 263 and 264 are driven in phase opposition by the secondary winding 232 of transformer 224 (Fig. 11), the center tap of this secondary winding being grounded and connected through a load resistor 267 to the center tap 269 of secondary winding 262. The plates of tubes 265 and 266 are operated in phase opposition by the secondary winding 233 of transformer 224. The center tap 270 of the winding 233 is connected through a load resistor 268 (Fig. 12) with the center tap 269 of secondary winding 262. The secondary windings 232 and 233 are so connected with the plates of tubes 263, 264, 265 and 266 that the plates of tubes 263 and 265 will be operated in opposite phase as will also the plates of tubes 264 and 266. With this arrangement, only one of the four tubes will remain on during any given half cycle of plate voltage, the other three tubes being turned off either because of the negative bias on the grids thereof, or because of a negative voltage on their plates. With this arrangement, when the pickup 164 is on its null and no signal is applied to the primary winding of transformer 261, only one tube of each pair, i. e. 263 or 264, or 265 or 266 will be turned on during any given half cycle of the plate voltage, the other tube being turned off due to the negative voltage on its plate. Hence, with zero input signal, the voltage drop across load resistors 267 and 268 will be equal and opposite so that center tap 270 will be at ground potential. When an error signal is delivered from the pickup to the input of the phase sensitive rectifier, only one of the four tubes will remain on during any given half cycle of plate voltage, this tube being one of the tubes 263 and 264 if the input signal is of one phase, and being one of the tubes 265 and 266 if the signal is of the opposite phase. For example, if the phase of the error signal from the depth pickup is such that the grid of tube 263 goes positive at the same time as the plate of that tube, it will continue to conduct and the voltage drop across resistor 267 will cause the reference point 269 to become positive with relation to ground. Since there is no drop across resistor 268 at this time, the tubes 265 and 266 both being turned off, the potential of reference point 270 will also be positive with respect to ground. On the next half cycle, the grid of tube 264 will go positive at the same time that the plate goes positive so that again a voltage drop will occur across resistor 267, and again reference point 270 will be positive with respect to ground.

If the phase of the error signal from the depth pick-up is reversed, then the tube 266 will conduct since its grid will be positive at the same instant as its plate. The resulting voltage drop across resistor 268 will cause the reference point 270 to become negative with respect to ground, there being no voltage drop during this half cycle across resistor 267 since the tubes 263 and 264 are cut off. On the next half cycle, the tube 265 will conduct and, again, reference point 270 will be driven negative with respect to ground. Hence, the voltage of reference point 270 with respect to ground will be indicative of the direction of displacement of tracing finger 34 with respect to its normal, centered position, and the magnitude of the potential difference between reference point 270 and ground will correspond to the extent of displacement of the tracing finger above or below its normal position.

The center tap 270 is connected through resistors 274 and 275 with the grid of a cathode follower tube 276. The midpoint between resistors 274 and 275 is grounded through normally closed relay contacts 277 when the vertical motion of the head is not being used in tracing. By means later to be described, when the machine is set for depth tracer control, the contacts 277 are opened to permit the rectified signal to pass to the grid of the cathode follower tube 276. A condenser 278 is connected between the junction point of the resistors 274 and 275 and ground to form, with resistor 274, a smoothing filter for reducing the ripple of the rectified signal voltage.

The plate of cathode follower tube 276 is connected to the positive terminal 191 of the regulated voltage source (Fig. 8), while the cathode is connected by a rheostat 279 and resistor 280 with a voltage divider comprised of a resistance 281 and potentiometer 282 connected between ground and the negative terminal 192 of the regulated voltage source (Fig. 8). The slider of the potentiometer 282 is connected through a resistor 283 with the input of a phase inverter comprised of vacuum tubes 284 and 285. The cathodes of tubes 284 and 285 are connected through a common resistor 286 with the negative terminal 192 of the regulated power supply while the plates are connected through appropriate load resistors 296 and 303 with the positive terminal 191 thereof. Bias voltage for the grid of tube 285 is provided through a voltage divider including resistors 287 and 288 connected in series with potentiometer winding 289 across positive and negative supply terminals 191 and 192. The slider of potentiometer 289 is connected through resistors 290 and 291 with the grid of tube 285.

The phase inverter functions in the following manner: When the reference point 270 becomes negative with respect to ground, the grid of 284 will likewise become more negative since it is connected to the output of cathode follower tube 276. The extent of the voltage drop on the grid of tube 284 will depend upon the setting of potentiometer 282 which thereby determines the sensitivity of the depth control. When the grid of tube 284 becomes more negative, the bias produced by resistor 286 will be reduced thereby reducing the bias on tube 285 whose grid is maintained at a fixed voltage. Consequently the drop across the load resistor 303 of tube 285 will be increased at the same time that the drop across the load resistor 296 of tube 284 is decreased. If the voltage at reference point 270 becomes positive with respect to ground, the grid of tube 284 will become more positive thereby increasing the voltage drop across biasing resistor 286 and increasing the bias on tube 285. Hence, the drop across the load resistor 303 of this tube will be reduced and the drop across the load resistor 296 of tube 285 will be increased.

The plate of tube 284 is directly coupled with the grid of a power amplifier tube 295 through a voltage divider consisting of resistors 297 and 298. These resistors are connected in series between the plate of tube 284 and negative supply terminal 192, the grid of tube 295 being connected through a grid resistor 299 with the junction between resistors 297 and 298. This provides proper bias for the grid of tube 295 while connecting it with the output from tube 285. The cathode of tube 295 is connected to ground while the plate thereof is connected to the positive supply terminal 177 (Fig. 7) through a torque motor coil 300 of an electro-hydraulic servovalve 307 (Fig. 6) which will be more fully discussed later herein. The plate of the tube 285 is directly coupled to the grid of a companion power tube 301 whose cathode is connected to ground and whose plate is connected to the positive supply terminal 177 through a torque motor coil 302 which operates in conjunction with coil 300 to control the electrohydraulic servovalve 307. The voltage divider for providing bias for tube 301 consists of resistors 304 and 305 which are connected between the plate of tube 285 and the negative supply terminal 192. The midpoint of resistors 304 and 305 is connected by a grid resistor 306 to the grid of tube 301. Tube 301 is thereby directly coupled with tube 285 in the same manner that power tube 295 is directly coupled to the output of tube 284. The action of the phase inverter is such as to cause tubes 295 and 301 to swing in opposite directions when a signal is delivered to the cathode follower tube 276. Potentiometer 289 provides a means of balancing the phase inverter so that equal currents will flow through torque motor coils 300 and 302 for a zero input signal to primary winding 260 of transformer 261.

The principle of operation of the servovalve 307, which serves to control the hydraulic actuator for the tool head 25 when the machine is placed under tracer control, may be understood by referring to Fig. 6 of the drawings wherein the valve is diagrammatically illustrated. Inasmuch as this valve is of a commercial type which is readily available on the market, and since the valve per se forms no part of my invention, it will be sufficient for the purposes of the present disclosure to merely explain the manner in which this valve functions in connection with the other elements of the control apparatus. As shown in Fig. 6, the torque motor coils 300 and 302 are wound on an armature 308 fastened at its center on a torque bar 309. The ends of the armature are disposed between the pole pieces of a pair of permanent magnets 316 and 317. When the currents flowing through the torque motor coils 300 and 302 are of equal magnitude, the poles formed at the ends of the armature will be equally repelled and attracted by the magnets 316 and 317 so that the armature will remain centered between the magnet poles. When the currents in the coils become unbalanced, the ends of the armature will be unequally repelled and attracted so that the armature will twist about the bar 309 in one direction or the other depending on the direction of unbalance of the currents in the coils. The ends of the armature are connected to the plungers of valves 318 and 319 and thereby control the flow of hydraulic fluid to and from the cylinder 56. When the currents in the coils 300 and 302 are equal and the armature is centered, the pressures on opposite sides of the piston 57 will be equal and the tool head will be held stationary. Any slight movement of the armature will cause the pressures to become unbalanced with resultant movement of the tool head. It is to be understood, of course, that the valve just described is only one example of several different types of valves, including primary-secondary valves, which might be used to apply the electric control to a hydraulically actuated machine.

To maintain the servovalve 307 controlled by coils 300 and 302 "alive" and immediately responsive to changes in current flow through the coils 300 and 302, means are provided for introducing a dither voltage onto the grid of tube 285. The dither signal is generated by a multivibrator comprised of vacuum tubes 310 and 311 whose cathodes are connected to ground and whose plates are connected through conventional load resistors with the positive voltage supply terminal 177. The circuit is conventional, the plate of one tube being coupled with the grid of the companion tube so as to provide positive feedback from the second tube back to the first tube.

The output is taken from the plate of tube 311 which is connected through condenser 312, resistor 313, and potentiometer 314 to ground. The slider of potentiometer 314 is connected through a resistor 315 to the grid of tube 285 via grid resistor 291. The potentiometer 314 thereby provides a means for controlling the amplitude of the dither signal, while the frequency thereof may be controlled by a potentiometer 342 connected between positive voltage supply terminal 177 and ground and having a slider connected to the grids of tubes 310 and 311 by grid resistors 343 and 344. By adjustment of the slider of potentiometer 340, the frequency of the dither signal may be suited to the requirements of the particular servovalves and machine structure involved. The frequency is generally not critical and, in the case of the particular valve and machine structures employed, may lie in the range of from 60 to 360 cycles per second.

*360° control*

The machine tool to which the present invention is shown applied is controlled in profiling operations by the 360° pickup which includes differential transformer 146 and its associated armature 145 which is moved up and down past the poles of the E-magnet 148 by sidewise deflections of the tracing finger 34. As shown in Fig. 13, the center leg of the transformer is provided with a winding 320 which is excited with 1000 cycle alternating current supplied thereto by secondary winding 231 of transformer 223 (Fig. 11). The outer legs of the E-magnet are provided with secondary windings 321 and 322 which are connected in phase opposition so that the voltage induced in one secondary will be 180° out of phase with the voltage induced in the other secondary and cause the voltages to effectively buck one another. As shown, one end of the secondary winding 321 is connected to ground while the other end thereof is connected to one terminal of secondary winding 322. The other terminal of this winding is connected to one end of primary winding 323 of transformer 324, the other end of the primary being connected to ground. Hence, when the armature 145 is centered with respect to the poles of the differential transformer, the voltages induced in secondaries 321 and 322 will be equal and oppoiste so that no current will flow through the primary winding 323. However, if the armature is moved above or below its central position, the voltage induced in one of the secondaries will be greater than that induced in the other so that it will predominate and appear across the primary winding 323. The phase of the voltage appearing across winding 323 will depend upon the direction of movement of the armature from its central position and the amplitude of the voltage will correspond with the extent of movement of the armature.

Transformer 324 is provided with a secondary winding 325, one end of which is connected to ground and the other end of which is connected to ground across potentiometer 326. The slider of the potentiometer is connected through a grid resistor 327 with the grid of an amplifier tube 328 whose plate is supplied with positive voltage from supply terminal 191 (Fig. 8) through the primary winding 329 of a transformer 330. The transformer 330 has a center tapped secondary winding 331 by means of which the error signal produced by the 360° pickup is supplied to the grids of vacuum tubes 332, 333, 334 and 335. As in the case of the depth control previously discussed in connection with Fig. 12 of the drawings, these tubes are connected in a phase sensitive amplifying rectifier arrangement so as to provide a D. C. signal at the point 336 which is representative of the direction and extent of deviation of the tracing finger 34 from its position of normal deflection. As in the case of the previously described phase sensitive rectifier for the depth control, the grids of tubes 332 and 334 are connected through grid resistors to one end of the secondary winding 331, while grids of tubes 333 and 335 are connected through grid resistors to the other end of the winding. The center tap is connected to the cathodes all four tubes. The plates of tubes 332 and 333 are driven in phase opposition with 1000 cycle alternating current derived from the local oscillator by means of the center tapped secondary winding 234 of transformer 225 (Fig. 11). As shown in Fig. 13, the ends of the secondary winding are connected to the plates of the tubes while the center tap 337 is connected to the common cathode connection by a load resistor 338. The center tap of the winding is also connected to a voltage divider comprised of a pair of resistors 339 and 340 of equal value connected between the positive and negative terminals 200 and 199 of the isolated power supply shown in Fig. 9.

The plates of tubes 334 and 335 are likewise driven in phase opposition from the 1000 cycle source by means of the center tapped secondary winding 235 of transformer 225 (Fig. 11). The ends of the secondary winding are connected to the plates of the tubes 334 and 335 and the center tap 336 is connected by a load resistor 341 with the common cathode connection. As in the case of the depth control, when the signal delivered by the 360° pickup to the primary winding 329 is zero, the voltage at center tap 336 will be equal to the voltage at center tap 337. If, however, the tracing finger 34 is deflected to one side or the other of its null position or position of normal deflection, an error signal which is either in phase or 180° out of phase with the current flowing in the secondary windings 234 and 235 will appear across the primary winding 329. Depending on the phase of the signal, the center tap 336 will be positive or negative with respect to the center tap 337. The magnitude of the voltage difference between the center taps will be dependent upon the extent of movement of the armature 145 from its centered position.

The reference point, or center tap, 336 is connected through resistors 345 and 346 to the grids of a pair of parallel connected cathode follower tubes 347 and 348. The plates of the tubes 347 and 348 are connected with the positive voltage supply terminal 200 while the cathodes thereof are tied together and connected through potentiometer 349 and resistor 350 with the negative voltage supply terminal 199. Since the potential of center tap 337 is constant and bears a fixed relation to the negative terminal 199, variations in the potentials of the grids of tubes 347 and 348 will cause a corresponding change in the potentials of the cathodes. When the tracer control is set for depth only, or when the machine is conditioned for hand servo operation, a pair of normally closed relay contacts 351 connected between the midpoint of resistors 345 and 346 and a line 352 connected to the center tap 337 will wash out the signal from the phase sensitive rectifier. When the machine is set for 360° tracing, however, the contacts 351 will be opened in a manner later to be explained and permit the signal to reach the grids of tubes 347 and 348.

The output of the cathode follower is taken off of the slider of potentiometer 349 and applied to one blade of a reversing switch 355. One blade of this switch is connected to the line 352 which connects with the center tap 337 while the other blade is connected to the slider of potentiometer 349. When the switch is thrown to the left as viewed in Fig. 13, the slider of the potentiometer is connected with a terminal 357 while the line 352 is connected with a companion terminal 356. These terminals are interconnected by a voltage dividing network including resistors 358 and 359 and potentiometers 360 and 361, the center of the network being connected at 369 to ground. Since the resistance values of resistors 358 and 359 are equal, as are also the resistance values of potentiometers 360 and 361, the voltage divider network is grounded at its electrical center so that voltage differences appearing across the terminals 356 and 357 will be equally displaced above and below ground potential. The sliders of potentiometers 360 and 361 are ganged together for coordinate movement as indicated by dotted lines 362 so as to move toward and away from the grounded ends of the potentiometer windings in unison. Thereby, when the sliders are brought to the grounded ends of the potentiometer windings, the output from the dividing network will be zero. Conversely, when the sliders are moved outwardly toward the outer ends of the windings, the output will be increased in a balanced relation with respect to ground.

The sliders of the potentiometers are connected with the grids of a pair of power amplifier tubes 365 and 366 whose cathodes are connected to ground through suitable cathode biasing resistors, one of which is preferably in the form of a rheostat 363 so as to permit balancing of the plate currents in the tubes. The plates of the power tubes are connected through torque motor coils with the positive voltage supply terminal 177. By suitable adjustment of the slider of potentiometer 349 with zero input to the phase sensitive rectifier, the potential of the terminal 356 or 357 connected thereto may be brought to the same potential as the terminal connected to the line 352. Since the power supply which furnishes the required D. C. potential to terminals 199 and 200 is ungrounded (Fig. 9), the system will be grounded at the point 369. Hence, when slider of potentiometer 349 is adjusted to bring the terminals 356 and 357 to the same potential, both terminals will lie at ground potential. Under these conditions, the plate currents of power tubes 365 and 366 will be equal and the plungers of the electrohydraulic servovalve 375 will be in a centered position. However, when an error signal appears across the primary winding 329 of transformer 330, a potential difference will appear across terminals 356 and 357 thereby increasing the plate current in one power tube and decreasing it in the other so as to bias the servovalve plungers in one direction or the other. The electrohydraulic servovalve which is controlled by torque motor coils 367 and 368 is similar to the valve 307 (Fig. 6) and controls the rotation of an hydraulic motor which rotates the steering device of the apparatus. This control will be fully described hereinafter.

Dither is introduced into the signal fed to the power tube 365 by means of a multivibrator circuit comprised of vacuum tubes 370 and 371 (Fig. 13) the plates of which are connected through load resistors to the power supply lead 191 and whose cathodes are connected to ground. The remainder of the circuit is like that shown in Fig. 12 in connection with the depth control and will not be further described other than to say that the output of the multivibrator is taken from the slider of a potentiometer 372 and delivered to the primary winding of a transformer 373 the secondary of which is connected in the grid circuit of power tube 365. Hence, oscillations produced by the multivibrator circuit will be introduced by transformer 373 onto the grid of tube 365 so that the output current flowing through torque motor coil 367 will contain the necessary dither to keep the valve "alive."

The torque motor coils 367 and 368 correspond to the coils 300 and 302 (Fig. 6) and, like those coils, control the displacement of plungers of the electrohydraulic servovalve 375 (Fig. 2). Valve 375 controls the flow of hydraulic fluid from pressure line 62 to and from a hydraulic turn motor 376 through motor lines 377 and 378. As shown in Fig. 15, this motor is supported within the control box 45 (Fig. 1) and drives, through a gear reducer 379, a spur gear 380 which meshes with an idler gear 381 which in turn meshes with the driving gear 382 of a clutch 383. The driven gear 384 of the clutch 383 drives, through an idler gear 385, a gear 386 mounted on the shaft 387 of a resolver unit 388. Hence, rotation of the turn motor 376 will cause corresponding rotation of the shaft 387. Steering of the cutter with relation to the work is controlled in accordance with the position of the shaft 387 by means of the control circuits shown in Fig. 14 of the drawings. Mounted on the resolver shaft 387 are two pairs of potentiometer sliders 395, 396 and 397, 398. The first-mentioned pair of sliders cooperates with a sine-cosine potentiometer winding 400 while the second-mentioned pair of sliders cooperates with a second sine-cosine potentiometer winding 401. The sliders 395 and 396 and the winding 400 constitute what will hereinafter be referred to as the "main" resolver, while the sliders 397 and 398 together with the winding 401 constitute what will hereinafter be termed the "quadrature" resolver. While the sliders 395, 396 and 397, 398 are both mounted on the same shaft 387, it will be noted that sliders 397, 398 are displaced 90° with respect to the sliders of the main resolver. It will also be understood that the main resolver supplies the main or running signal for the machine while the quadrature resolver applies the error or correction signal thereto.

To accomplish this result, a steady, direct current voltage is applied across the winding 400 from the positive and negative voltage supply terminals 191 and 192 of the regulated voltage source (Fig. 8). This voltage is applied across the winding 400 by means of a pair of similar resistors 404 and 405, and a pair of similar potentiometers 406 and 407 whose sliders are ganged together for simultaneous movement as indicated by the dotted lines 408. When normally open relay contacts 409 and 410 are closed, voltage from the regulated source will be applied to terminals 411 and 412 of the potentiometer winding 400. Therefore, current will flow from the terminal 411 to the terminal 412 through both halves of the winding, the currents flowing in the two halves being equal since the resistance of the windings in the two halves are equal. Also, the potential at the midpoint terminals 413 and 414 will be at zero or ground potential and the potential difference between negative terminal 412 and ground will be equal and opposite to the potential difference between positive terminal 411 and ground. As shown the winding is actually referenced to ground by connecting terminals 413 and 414 to a grounded portion of the apparatus.

The winding 400 is so constructed as to cause the potentials on sliders 395 and 396 to vary as the sine and cosine functions of the angular displacement of the shaft 387. That is, assuming the position of the shaft 387 shown in Figure 14 to represent the position of zero displacement, the voltage on slider 395 will be equal to the sine of an angle of zero degrees, that is, zero volts, while the potential of slider 396 will be equal to the cosine of an angle of zero degrees, that is, the maximum positive value. As the shaft is rotated through 90° counterclockwise, the potential on slider 395 will increase rapidly at first and then more slowly until it reaches a maximum positive value, while the potential on slider 396 will decrease slowly at first and then more rapidly until it reaches a zero value. Or, if the shaft is rotated through 90° in a clockwise direction from the position shown in Fig. 14, the potential on slider 395 will change rapidly and then more slowly to a maximum negative value while the potential on slider 396 will change slowly and then more rapidly from a maximum positive potential to zero potential. By means hereinafter to be described, the voltages derived from the sliders 395 and 396 are thereafter applied to electrohydraulic servovalves for controlling the movement of the table and cross slide so that the movements of these parts will correspond in direction and speed with the sign and magnitude of the voltages appearing on the sliders. Consequently, the feed rate of the cutter with relation to the work will correspond to the resultant of the sine and cosine components and will remain constant for all directions of movement.

Whenever the tracing finger 34 is overdeflected or underdeflected from its null position, the rectified error signal appearing on terminals 356 and 357 will be introduced in quadrature relation to the main steering signal so as to cause a correction to be introduced which is normal to the direction of travel of the cutter and in such a direction as to return the tracing finger to its null position. As shown in Fig. 14, the rectified error signal appearing on terminals 356 and 357 is applied to terminals 420 and 421 of the sine-cosine winding 401 of the quadrature resolver. This resolver is similar in all respects to the main resolver previously described, the only difference being that the sine and cosine sliders 397 and 398, respectively are displaced 90° counterclockwise on the common shaft 387 from the corresponding sliders 395 and 396 of the main resolver. Hence, a directional component of motion displaced 90° with respect to the movement produced by the main steering or running signal will be introduced by the quadrature resolver and the magnitude and direction of this motion will vary in accordance with the magnitude and sign of the error signal appearing on terminals 356 and 357. Winding 401, like winding 400 of the main resolver, is provided with a pair of grounded midpoint terminals 422 and 423.

The sine and cosine components of the error signal obtained from the quadrature resolver are combined with the sine and cosine components of the running voltage derived from the main resolver by means of the resistance network shown interposed between the two resolvers. It will be seen that the sine component of the running voltage, which is represented by the voltage between terminal 414 and slider 395, is applied across series-connected resistors 425 and 426 and potentiometer winding 427. The sine component of the error signal, which is represented by the voltage appearing between terminal 423 and slider 397, is applied across resistors 428 and 429 and potentiometer winding 430. The sliders of potentiometers 427 and 430 are connected to a common terminal 431 through resistors 432 and 433. The voltage at terminal 431 will, therefore, be proportional to the algebraic sum of the sine components of the running signal and the error signal.

In a like manner, the cosine components of the main or running signal, and the quadrature, or error signal, are added algebraically at the junction 437 by a corresponding resistance network including potentiometers 438 and 439. As indicated in the drawing, the sliders of potentiometers 427 and 438 are ganged together as indicated by the dotted lines 440 so that both sliders may be moved inward toward the grounded end of the resistance arms, or outward toward the high end thereof, so as to regulate the proportion of the sine and cosine components of the running signal taken off by the potentiometer sliders. In a similar manner, the sliders of potentiometers 430 and 439 are ganged together as indicated by the dotted lines 441 so as to enable the desired proportion of the sine and cosine components of the error signal to be applied to the junctions 431 and 437. Hence, tthe tracing speed of the apparatus may be conveniently controlled by manipulation of potentiometers 427 and 438, while the sensitivity of the error correction device may conveniently be controlled by manipulation of potentiometers 430 and 439.

The combined sine components as represented by the voltage appearing at junction 431 are fed into D. C. amplifier 445 which includes a pair of phase inverter tubes 446 and 447, a pair of power output tubes 448 and 449, and a multivibrator circuit for introducing dither, including vacuum tubes 450 and 451. This amplifier is supplied with D. C. power from the terminal 177 of the main power supply (Fig. 7) and terminals 191 and 192 of the regulated power supply (Fig. 8). An amplifier 452 which is similar in all respects to the amplifier 445 is provided for amplifying the combined cosine components derived from the main and quadrature resolvers and appearing at the junction 437. In view of the identical construction of these two amplifiers, only the amplifier 445 will be described in detail.

As shown, junction 431 is connected through a resistor 455 with the grid of the tube 446 which, with the tube 447, constitutes a phase inverter which operates in a manner similar to the phase inverter, including tubes 284 and 285 (Fig. 12), described in connection with the depth control circuit. As in the previously described circuit, the cathodes of tubes 446 and 447 are tied together and connected through a biasing resistor 456 to the negative supply terminal 192. The plates of the tubes are connected by load resistors 457 and 458 with the positive supply terminal 191. The tube 446 is directly coupled with the power output tube 448 by a voltage divider consisting of resistors 459 and 460 connected between the plate of the tube and the negative supply terminal 192. The grid of tube 448 is connected with the junction of resistors 459 and 460 by a grid resistor 461. In a similar manner, the plate of tube 447 is directly coupled to the grid of power tube 449 by a voltage divider consisting of resistors 462 and 463, and a grid resistor 464. Bias on the grid of tube 447 is provided by a voltage divider including resistors 465 and 466 and potentiometer 467 connected between the voltage supply terminals 191 and 192. The slider of potentiometer 467 is connected to the grid of tube 447 by a pair of series connected resistors 468 and 469. As previously described, a signal appearing on the grid of tube 446 will cause the grids of tubes 448 and 449 to be driven in opposite directions. Hence, plate current flowing through the torque motor coil 475 connected in circuit between the plate of tube 448 and the positive supply terminal 177 will be changed in one direction from its normal value, while the plate current flowing in a second torque motor coil 476 will be changed in the opposite direction from normal value and to a like extent. The torque motor coils 475 and 476 correspond in construction and function to the torque motor coils 300 and 302 of the electrohydraulic servovalve 307 shown in Fig. 6 and are associated with a valve identified by reference numeral 477 in Fig. 2 of the drawings.

Dither is introduced into the circuit by the multivibrator including tubes 450 and 451 which are connected in a circuit identical with that shown for the tubes 310 and 311 (Fig. 12) and hence require no further discussion. The output from the multivibrator is taken off the plate of tube 451 through a condenser 480, resistor 481 and potentiometer 482. The slider of the potentiometer is connected with the junction of resistors 468 and 469 and provides a means for adjusting the amount of dither fed on to the grid of tube 447.

Balancing of the phase inverter so as to result in equal currents flowing through the torque motor coils 475 and 476 when junction 431 is at ground potential, may be effected by manipulation of slider of potentiometer 467 which varies the bias on the grid of tube 447 and thereby controls the potential on grid of tube 449.

Amplifier 452 for the cosine components appearing at junction 437 functions in the same manner as amplifier 445 to cause unbalancing currents to flow through torque motor coils 483 and 484 which are employed in connection with an electrohydraulic servovalve 485 (Fig. 2) similar in construction and operation to the valve 307 diagrammatically illustrated in Fig. 6 of the drawings.

Means is provided in the instant apparatus for automatically reducing the tracing speed of the machine when an abrupt change in the pattern outline in 360° tracing causes a large overdeflection or underdeflection of the tracing finger and a correspondingly large error signal from the 360° pickup. This allows more time for "quadrature" and "steering" action to take place and reduces the tracing error which would otherwise occur. For this purpose, as shown in Fig. 13, a potentiometer 500 is connected across the secondary winding 325 of the 360° pickup transformer 324. The slider of this potentiometer is connected by a resistor 501 with the grid of an amplifier tube 502. The plate of the tube is connected with the positive supply terminal 191 through a primary winding 503 of a transformer 504. The transformer is provided with a secondary winding 505 (see Fig. 14) which is connected in series with a load resistor 506 and triode vacuum tube 507 having its grid connected with its plate so as to operate as a diode. Hence, the 360° error signal produced by the pickup 146 will be rectified by tube 507 and the rectified voltage will appear across resistor 506 which is shunted by a filtering condenser 508. This will cause the end of resistor 506 connected with the plate of the tube to become negative with respect to the opposite end of the resistor which is connected to the slider of a potentiometer 510 connected in series with a resistor 511 between the negative supply terminal 192 and ground. The plate of tube 507 is connected to the grid of an amplifier tube 512 by a resistor 513. The cathode of the tube 512 is connected to negative terminal 192 and the plate thereof is connected through a load resistor 514 to the positive supply terminal 191. The bias on the grid of tube 512 may be adjusted by means of the slider of potentiometer 510, thereby likewise controlling the bias on the grid of a slowdown tube 515, the grid of which is connected by a resistor 516 with the plate of tube 512. The plate of tube 515 is connected with the slider of the potentiometer 406 while the cathode thereof is connected with the slider of the potentiometer 407, the sliders of these two potentiometers being ganged together as indicated by the dotted line 408. The slider of potentiometer 510 is set to a position where the grid of tube 512 will be sufficiently positive to cut off the tube 515 which will thereby present an infinite impedance to the flow of current from the slider of potentiometer 406 to the slider of potentiometer 407. However, when the error signal produced by the 360° pickup exceeds a predetermined value, it will produce a rectified voltage across the resistor 506 of sufficient magnitude to bias the grid of tube 512 down to a point where its plate becomes sufficiently positive to cause a substantial current to flow through the tube 515. This will increase the voltage drop across resistors 404 and 405 and across the outer ends of potentiometers 406 and 407 and reduce the voltage across the terminals 411 and 412 of potentiometer winding 400. This will, in turn, reduce the sine and cosine components of the running voltage derived from the main resolver and diminish the speed of the cutter relative to the work. Slowdown sensitivity may be controlled by manipulation of the sliders of potentiometers 406 and 407. Obviously, as the sliders are moved outward, the sensitivity of the slowdown circuit will be reduced whereas, when the sliders are moved inwardly, the voltage drop between the terminals 191 and 192 and the sliders 406 and 407, respectively, will be increased for a given current flow through the tube 515 and the sensitivity of the slowdown control will be increased. The slider of potentiometer 510 provides means for adjusting the amount of error signal which must be present before slowdown takes effect.

Referring now to Fig. 13, a potentiometer 520 is connected in parallel with the potentiometer 500 across the secondary winding 325 of transformer 324. The slider of this potentiometer is connected by a resistor 521 with the grid of an amplifier tube 522 whose plate is connected through the primary winding 253 of the transformer 252 with the positive supply terminal 191. It will be recalled that the secondary winding 251 is connected in series with the secondary winding 247 (Fig. 12) of transformer 246 when the blade of switch 249 is in the "Depth" position, that is, in contact with terminal 250. Hence, in this position of the switch, the signal from the 360° pickup 146 will be combined with the signal from the depth pickup 164 on the grid of tube 259. Thus, the signal provided to the depth phase sensitive rectifier shown in Fig. 12 will be dependent not only on the vertical displacement of the tracing finger 34 by the pattern but also on the sidewise deflection of the finger which will vary with the degree of slope or inclination of the surface being traced. This feature is incorporated in the tracer in order to produce a rapid rise of the head 25 when the tracing finger encounters a steep slope or wall on the pattern.

The transformer 252 is so connected in the circuit that the signal from the 360° pickup 146 appearing in secondary winding 251 when the tracing finger is vertical, i. e., underdeflected, is in phase with the underdeflected or "down" signal from the depth pickup 164. This means then, that in order to reach a null with the finger in its straight up and down position, it must be displaced upwardly beyond its normal, null position by an amount sufficient to produce an "up" signal from the depth pickup which will balance out the "down" signal from the 360° pickup. This position will depend on the setting of potentiometer 520 (Fig. 13) which determines the amount of 360° signal fed back into the depth control circuit. The tracer will therefore normally trace with the finger in this overdeflected position so long as the vertical rise and fall of the pattern is not sufficiently steep to deflect the finger sidewise. Upon a slope being encountered, however, of sufficient steepness to deflect the tracing finger sidewise toward its null position, not only will the tracing finger be displaced upwardly beyond its elevated null position by the rise in the pattern, but also the counterbalancing 360° signal will be diminished so as to further increase the "up" signal from the depth pickup. Hence, a very rapid rise of the head will result from the large "up" signal delivered to the depth control circuit.

In three dimensional tracing when all three motions of the cutter relative to the work are under the control of the tracing apparatus, it is not possible to utilize the combined depth and 360° signals to cause a rapid rise of the head when steep slopes are encountered in depth tracing as just described since in 360° tracing, the finger 34 must be normally maintained in its null, or partially deflected, position as it follows along the edge of the templet or pattern. Therefore, when three dimensional tracing is desired, the blade of switch 249 is placed in contact with terminal 248 so that the signal from the depth pickup only will be fed into the depth phase sensitive rectifier shown in Fig. 12.

Tracer control

As mentioned earlier herein, in connection with Fig. 2 of the drawings, when the machine is set for hand servo control, solenoid valves 85 and 110 will be energized so as to render hand servo valve 67 effective to control the flow of hydraulic fluid to and from the head cylinder 56 and to connect the line 109 with drain to permit engagement of the half nut 104 with the feed screw 103 thereby enabling the feed screw to control movement of the plunger of valve 67. The means for controlling the energization of solenoid valves 85 and 110 is shown in Fig. 10 which shows the selector switch 44 utilized for changing the machine over from hand control to tracer control, and vice versa, and the electrical circuits controlled by this switch. As therein shown, the selector switch 44 having a blade 525 is settable to any one of three positions designated by the legends "Hand," "Depth (+360)," and "360." A source of electric current for operating the controls is obtained from line terminals 526 which may, for example, be a source of 110 volt, 60 cycle current. When main switch 527 is closed, power leads 528 and 529 will be energized. In Fig. 10, the solenoid winding for valve 85 is indicated by reference numeral 530 and the solenoid winding for valve 110 is indicated by reference numeral 531. The winding 530 is connected across power leads 528 and 529 in series with a pair of normally closed contacts 532 (back contacts) of a relay 533. In a similar manner, the winding 531 of valve 110 is connected across the power leads 528 and 529 in series with the normally closed limit switch 155 (see also Fig. 5) and a second pair of normally closed contacts 536 of relay 533. Hence, when the machine is placed in operation and the main switch 527 closed with the selector switch 44 set in the "Hand" position as shown in Fig. 10, windings 530 and 531 will be energized to shift the plungers of valves 85 and 110 as required for hand operation of the machine.

When the blade 525 of switch 44 is moved to the depth position, as indicated by terminal 540, relay 533 will be energized as will also the solenoid winding 541 of a solenoid valve 542 (see also Fig. 2). Energization of relay 533 will cause contacts 532 and 536 to open thereby deenergizing solenoid valves 85 and 110. Deenergization of valve 85 blocks lines 87 and 89 (Fig. 2) and effectively cuts off the hand servovalve 67 from the head cylinder 56. Deenergization of solenoid valve 110 on the other hand, causes fluid under pressure to flow through line 109 thereby disengaging the half nut 104 so as to free the valve plunger from the hand control mechanism. Energization of solenoid valve 542 (see also Fig. 2) effectively connects the electrohydraulic tracer valve 307 with the motor lines 86 and 88 of the head cylinder 56 thereby causing movement of the head to be controlled by valve 307. Energization of relay 533 also opens the pair of normally closed contacts 277 (Fig. 12) so as to enable the depth signal from the tracing head to pass through to the power amplifier and thereby control the flow of current through torque motor coils 300 and 302 in the manner previously described in connection with valve 307. With the selector switch 44 in the depth position, the selector valve 68 (Fig. 2) will remain in the hand position as shown in Fig. 2 and hand servovalves 65 and 66 will remain effective to control the positioning of the table and cross slide in accordance with rotation of the hand wheels.

When the switch 44 (Fig. 10) is set for 360° tracing, that is when the blade of the switch is moved into contact with terminal 545, a circuit will be established from power lead 528 to power lead 529 through a pair of normally closed contacts (back contacts) 546 of relay 533, now deenergized, and through a solenoid coil 547 of a solenoid valve 548 (see also Fig. 2). This valve, as shown in Fig. 2, when energized, will connect the pressure line 62 with a line 549 which is connected with selector valve 68 and causes plunger 69 to be shifted to the left. At the same time, a line 550 will be connected with drain line 80 thereby exhausting oil from the end of plunger 70 and allowing it to move to the right. The selector valve 68 is thereby shifted from hand servo position to tracer control position. Shifting of plunger 70 to the rigth will connect motor line 75 for the table cylinder 50 with a line 551 leading to the tracer control valve 477. At the same time, motor line 77 for the cylinder 50 will be connected with a line 552 also connected with the valve 477. In a like manner, motor lines 81 and 83 for the cross slide cylinder 53 will, upon shifting of plunger 69 to the left, be communicatively connected with lines 553 and 554 leading to the tracer control valve 485. Hence, energization of solenoid valve 548 and consequent shifting of selector valve 68 to the tracer control position, will place the table and cross slide under the control of tracer control valves 477 and 485.

Means are provided for maintaining the tracer control valves 477 and 485 immobilized until the tracing finger 34 is brought into contact with the edge of the templet or pattern. This is done to avoid travel of the cutter relative to the work due to the undeflected condition of the tracing finger under such circumstances. However, as soon as the tracing finger is brought into contact with the pattern, the initial deflection of the finger will bring the valves into the circuit. As previously described, deflection of finger 34 permits the contacts of the limit switch 154 (Figs. 5 and 10) to close. This causes a relay 560 to be energized thereby closing the normally open contacts 561 of the relay and energizing a relay 562 whose normally open contacts 563 are thereby closed. Closure of contacts 563 will be effective to pull in solenoid valve 548 even though the selector switch 44 be in its "Hand" position. That is, in the event that the switch should be in the "Hand" position and the tracing finger 34 be deflected, closure of limit switch 154 in the tracing head will energize relay 560, close contacts 561, and energize relay 562 with consequent closing of contacts 563 to energize solenoid coil 547. This will cause automatic changeover of the selector valve 68 (Fig. 2) from hand servo control position to tracing control position and thereby condition the machine for automatic operation under the control of the tracing head. When the selector switch 44 (Fig. 10) is in the "Depth" position, however, closure of limit switch 154 will not be effective to change the machine over to automatic 360 tracing since contacts 546 are then open due to energization of relay 533.

Energization of relay 560 will cause contacts 351 (Fig. 13) to open thereby permitting the 360 error signal to pass through the circuit and control the operation of the tracer control valves for the table and cross slide. Similarly, energization of relay 562 will cause the two pairs of contacts 409 and 410 (Fig. 14) to be closed so as to render the main resolver effective to control feeding of the cutter relative to the work.

In the event of overdeflection of the tracing finger, the limit switch 155 will be opened to thereby deenergize solenoid valve 110. This will cause line 109 to be connected to fluid pressure line 62 thereby releasing the half nut 104 and allowing spring 106 to bias the plunger of hand servovalve 67 upwardly. This will cause fluid from pressure line 62 to be delivered into the upper end of the head cylinder 56 which, it will be recalled, is fast on the head 25. The head will therefore rise and move the cutter up out of engagement with the work. Upward travel of the head lifts the tracing finger off the pattern and allows limit switch 155 to close. This reenergizes solenoid valve 110 thereby reengaging the half nut 104 to stop further upward travel of the head.

When the selector switch 44 is set for either depth tracing or 360° tracing as hereinbefore described, means are rendered effective to disable the nonselected tracing control. That is, with the switch 44 moved into contact with terminal 540 for depth tracing, the contacts 546 of relay 533 are caused to open thereby preventing energization of solenoid valve 548 and maintaining selector valve 68 in the hand tracing position shown in Fig. 2. When the blade of switch 44 is moved into contact with terminal 545, contacts 532 and 536 of relay 533 will be closed thereby causing solenoid valves 85 and 110 to remain energized which, as previously described, renders the hand servovalve 67 effective for the head cylinder 56.

Three dimensional tracing may be effected with the present control apparatus by moving the selector switch 44 to the "Depth" position where the blade of the switch makes contact with terminal 540. At the same time, a switch 565 is closed thereby bridging the contacts 546 of relay 533 so as to enable energization of the winding 547 of solenoid valve 548 upon closure of contacts 563. The latter relay contacts will be closed upon contact being made by the tracing finger with the edge of the pattern which will close limit switch 154 in the tracing head to energize relay 560, close that relay's contacts 561 and energize relay 562 to close contacts 563. Hence, the selector valve 68 will be shifted to tracing control position and the circuits will be set up for joint depth and 360° tracing control by the tracing finger 34.

*Hand steering control*

Means are provided for effecting manual steering of the tracer and cutter in any desired direction so as to enable the operator of the machine to bring the tracer into contact with the pattern when the machine is set for automatic tracing. Also, when it is desired to remove the tracer from contact with the pattern, the manual steering control may be employed to steer the tracing finger away from the pattern and cause automatic feeding movement of the tracer and cutter to be stopped. As best shown in Fig. 15, a manual steering knob 570 is secured to a shaft 571 journaled in a bushing 572 mounted on the inner face of the control box 45 (Fig. 1). The clutch gear 382 is free on the shaft 571 and is retained in position on the shaft with its upper face lying against the bottom of the bushing 572 by a ring 573 fastened to the upper face of the gear and overlying the upper face of gear 381 driven by the turn motor 376. The lower clutch gear 384 is secured to the shaft 571 by a set screw 574, and the shaft and gear 384 are normally urged toward the gear 382 so as to engage the teeth of the clutch 383 by a compression spring 575 bearing against a frame bracket 576 and pressing against the underside of gear 384. Also secured on the bracket 576 is a limit switch 577 the operating button of which lies directly beneath the end of shaft 571. Consequently, when shaft 571 is depressed by pushing in on steering knob 570, the normally open limit switch 577 will be closed and the clutch 383 will be disengaged to permit manual rotation of the resolver shaft 387 without interference by the turn motor 376.

It will be seen by referring to Fig. 10, that closure of limit switch 577 will cause relay 562 to be energized thereby closing the pairs of contacts 409 and 410 (Fig. 14) to bring the main resolver into the circuit and permit steering voltages to be applied to the tracer control valves for the table and cross slide. At the same time, contacts 563 will be closed to energize winding 547 of solenoid valve 548 thereby setting selector valve 68 to its tracer control position. The tracer control valves for the table and cross slide will thereby be rendered effective and hand steering of the tracing finger and cutter may be effected under the control of steering knob 570. In this way the tracing finger 34 may be brought into contact with the edge of the templet or pattern whereupon limit switch 154 will be closed and automatic tracing will commence, the hand steering knob being released as soon as contact is effected. To remove the tracing finger from the pattern, it is only necessary to press in on the steering knob 570 to declutch the turn motor from the resolver whereupon the tracing finger and cutter may be steered away from the pattern and work by turning the knob 570 in the appropriate direction. Release of the handknob after the tracing finger has been removed from the edge of the pattern will bring the machine to rest since the relays 560 and 562 will be deenergized so as to remove voltage from the main potentiometer and cause tracing valves 477 and 485 to be centered.

It should be noted that the hand steering knob and resolver have no mechanical connection with the tracing head. In fact, all of the controls including cutting speed, steering, sensitivity, etc., can be and are divorced from the tracing head. These controls may be placed in any position where they are within easy reach of the operator and can, if necessary, be at a considerable distance from the tracing head.

*Operation*

From the foregoing description of the construction of my electrohydraulic tracer control apparatus and of the manner in which the various parts thereof are combined and function to provide automatic control of the milling machine under the control of a master or pattern, it is believed, that a clear understanding of the principles underlying my invention will be obtained. It may be helpful, however, by way of summary to briefly describe the operation of the machine in conjunction with the block diagram of the system shown in Fig. 16.

After the workpiece 28 (Fig. 1) and pattern 35 have been set up on the table 21 of the machine with the tracing head 33 suitably adjusted with relation to the tool head 25 to place the tracing finger 34F in the same relative position with respect to pattern 35 that the cutter 27 bears with respect to the work 28, selector switch 44 is positioned to set the machine for automatic tracer operation after which the hand steering knob 570 may be pressed down and rotated to steer the finger 34 into contact with the pattern 35. Thereafter, the automatic controls heretofore described will take over and cause the finger 34 to follow the outline of pattern 35, the finger moving around the pattern in either a clockwise or counterclockwise direction depending on the setting of reversing switch 355 (Fig. 13). Although the present illustration of the invention deals with outside tracing, it is understood that an inside surface or recess may be traced with equal facility.

In the present example of operation of the machine, it will be assumed that the selector switch 44 is set to the "Depth (+360)" position (Fig. 10) that is, the position in which the switch blade 525 is in contact with the terminal 540. It will also be assumed that switch 565 is closed to permit three dimensional tracing to be performed. With the circuits set up in this manner, when the steering knob 570 is depressed, switch 577 will be closed thereby energizing relay 562 which in turn closes contacts 563 and energizes solenoid valve 548. This will cause the selector valve 68 (Fig. 2) to be moved from the "Hand" to the "Tracer" position so as to render tracer control valves 477 and 485 for the table and cross slide effective, and at the same time cutting hand servovalves 65 and 66 out of the hydraulic circuit. Solenoid valves 85 and 110 will also be deenergized so as to place the tool head, or vertical slide, under the control of tracer control valve 307 so as to enable the tracing head to control the depth of the cut.

Upon energization of relay 562, contacts 409 and 410 (Fig. 14) will be closed so as to bring the main resolver in the electrical circuit and enable steering of the cutter and tracing finger under the control of the hand steering knob 570.

As soon as the finger 34 is deflected sidewise by contact with the edge of the pattern, switch 154 (Fig. 10) will be closed to energize relay 560 and provide a holding circuit for relay 562 by closure of contacts 561. Energization of relay 560 also opens the relay contacts 351 (Fig. 13) so as to permit the 360° error signal to pass through to the quadrature resolver 401 (Fig. 14) and to the rotation control valve 375. Since relay 533 (Fig. 10) is likewise energized, contacts 277 (Fig. 12) will be open thereby permitting the signal from the depth pickup to pass through and control the operation of tracer valve 307 (Fig. 2) which is in control of the cylinder 56 for the tool head. As the tracing finger 34 follows the pattern 35, any variations in the elevation of the ledge 584 (Fig. 1) of the pattern will cause an overdeflection or underdeflection of the lateral extension 127 (Fig. 3) of the tracing finger and thereby cause an in phase or 180° out of phase signal to be produced by the depth pickup 164 (Fig. 12). As shown in Fig. 16, the oscillator 585, which corresponds to the Wien bridge oscillator shown in Fig. 11, supplies alternating current to the tracing head 33 for energizing the depth and 360 pickups located in the head. Any vertical displacement of the finger 34 will cause a signal from the depth pickup to be transmitted to the amplifier 586, which corresponds to the amplifier including tube 259 in Fig. 12, and thence to the phase sensitive rectifier 587 (Fig. 16) which corresponds to the phase sensitive rectifier shown in Fig. 12 and which includes tubes 263, 264, 265 and 266. The rectified signal from the phase sensitive rectifier is delivered to amplifier 588, which includes power amplifier tubes 295 and 301 (Fig. 12) which control the flow of current through torque motor coils 300 and 302 of the tracer control valve 307. This valve in turn controls the flow of hydraulic fluid to and from the hydraulic actuator 56 that moves the tool head up and down on the cross slide.

Sidewise displacement of the tracing finger 34 is effective to move the lateral extension 138 (Fig. 3) up or down from its neutral or null position to provide an in phase or 180° out of phase signal from the 360° pickup 146 (Fig. 13). This signal is delivered to amplifier 589 (Fig. 16) which corresponds to the amplifier including tube 328 shown in Fig. 13. The amplified signal is then rectified in phase sensitive rectifier 590, which corresponds to the phase sensitive rectifier shown in Fig. 13 and which includes tubes 332, 333, 334 and 335. The output of the phase sensitive rectifier 590 is a D. C. signal whose sign corresponds to the phase of the signal from the 360 pickup 146 and whose magnitude depends on the magnitude of the signal from the pickup, that is, on the extent of sidewise displacement of the tracing finger 34 from its null position. This signal is then delivered to amplifier 591, which includes power tubes 365 and 366 (Fig. 13) which control the flow of current through torque motor coils 367 and 368 of tracer control valve 375 (Fig. 2) which controls the rotation of turn motor 376. This adjusts the main and quadrature resolvers 400 and 401 so as to adjust the directional heading of the tracing finger and cutter in the proper sense to return the finger to its null position. The error signal from the phase sensitive rectifier 590 is also fed to the quadrature resolver 401 where it is resolved into sine and cosine components and combined with similar components from the main resolver 400 to introduce a correction along an axis displaced 90° from the main axis of tracing. One of the combined components is delivered to X amplifier 445 (Fig. 14) while the other of the combined components is fed to Y amplifier 452 (Fig. 14). Amplifier 445 includes power tubes 448 and 449 which control the flow of current through torque motor coils 475 and 476 of tracer control valve 477 which controls the flow of hydraulic fluid to and from the hydraulic actuator 50 for the table 21. The Y amplifier 452 includes torque motor coils 483 and 484 which control the operation of the tracer control valve 485 for the hydraulic actuator 53 for the cross slide. Running voltage for the tracer control apparatus is supplied to the main resolver by rectifier 592 which corresponds to the power supply shown in Fig. 8. In Fig. 16, the cross slide has not been shown as a separate element but, instead, the actuator 53 is shown as applied to the table 21 to move it in a direction at right angles to the motion given it by the actuator 50.

By this means the tracing finger 34 is caused to follow the contour of the ledge 584 (Fig. 1) and the edge of the projecting center portion of the pattern 35, the cutter 27 following, of course, each and every movement of the tracing finger so as to reproduce in the workpiece 28 a contour identical with that of the pattern. After the reproduction of the workpiece has been completed, the machine may be stopped by pressing down on the hand steering knob 570 (Fig. 1) and turning the knob to thereby rotate the resolver shaft and steer the finger out of contact with the pattern and move the cutter away from the work. When the tracing finger loses contact with the pattern, the switch 154 will open thereby deenergizing relay 560 (Fig. 10) and causing relay contacts 351 (Fig. 13) to close. This will short out the error signal from the phase sensitive rectifier 590 (Fig. 16). Release of the hand steering control knob will permit switch 577 (Fig. 10) to open thereby deenergizing relay 562 and permitting contacts 563 to open. This will deenergize solenoid valve 548 and permit selector valve 68 (Fig. 2) to return to the hand servo control position. Upon setting the selector switch 44 to "Hand" position, relay 533 will be deenergized thereby energizing solenoid valves 85 and 110 and closing contacts 277 (Fig. 12) to short out the signal from the phase sensitive rectifier 587 (Fig. 16). This will restore the tool head 25 to hand servo control in the event that it is desired to use the milling machine as a manually controlled machine.

Although I have described my invention in connection with one possible form or embodiment thereof, and have used, therefore, certain specific terms and language herein, it is to be understood that the present disclosure is illustrative rather than restrictive and that changes and modifications may be resorted to without departing from the spirit or scope of the claims which follow.

Having thus described my invention, what I claim as new and useful and desire to secure by United States Letters Patent, is:

1. In a milling machine having a cross-feed slide, a cutting tool on said slide, and a workpiece slide movable transversely to said cross-feed slide for supporting the workpiece for 360° movement relative to said tool, the combination of fluid pressure motors for moving said slides, a pattern carried by one of said slides and a tracer carried by the other of said slides for 360° movement relative to said pattern, said tracer including a non-directional finger adapted to contact the side of said pattern and to be given a normal deflection thereby in any direction from zero to 360 degrees as the tracer follows along the pattern, means controlled by the over or under-deflection of said finger for causing an electric signal of one phase or another to be produced depending on the direction of deflection of said finger from its position of normal deflection, and means including electromagnetic valve means for controlling the operation of said motors in accordance with said signals so as to cause said cutting tool to shape the workpiece in conformity with the contour of the pattern.

2. The machine of claim 1 wherein said last-recited means also includes an electric resolver remote from said tracer for steering said cutting tool relative to the workpiece and means controlled by said signal for adjusting said resolver in one direction or the other in accordance with the phase of said signal to maintain said finger in a position of normal deflection.

3. The machine of claim 2, including a second electric resolver operating in synchronism with said first mentioned resolver for introducing a component normal to the direction of travel of the tool with respect to the workpiece in accordance with the character of the electric signal produced by deflection of said finger from its normal position.

4. In an automatic machine for effecting 360° tracing of a pattern having a tracer provided with a non-directional tracing finger for following the contour of the pattern the combination of a source of alternating current, means controlled by said tracing finger for producing an alternating current signal either in phase or 180° out of phase with said source whenever said tracing finger deviates from the pattern contour, the phase of said signal depending upon the direction of deviation of the tracing finger from the pattern contour, means for comparing the phase of said signal with that of said source to produce an error signal which is indicative of the direction of deviation of said tracing finger from said pattern contour, power-operated means for moving said tracer through a full 360 degrees of movement relative to said pattern, a settable device for controlling said power-operated means to determine the direction of movement of said tracer relative to said pattern, and means controlled by said error signal for adjusting the setting of said device to cause the tracing finger to follow the contour of the pattern.

5. The machine of claim 4, wherein said settable device is located at a distance from said tracer.

6. In a machine for automatically reproducing the shape of a pattern having a pair of transversely movable supports, a pattern mounted on one of said supports, and a non-directional tracer mounted on the other of said supports, the combination of power means for moving each of said supports, a finger carried by said tracer for contacting said pattern and following the contour thereof, means controlled by said finger for producing an electric signal whenever said tracer deviates from the contour of the pattern, a source of feed rate voltage, means including a settable device having a directional characteristic for resolving the feed rate voltage into two components, means controlled by said components for determining the rate and direction of movement of said power means to cause said tracer to move in a predetermined direction with respect to said pattern, and means controlled by said signal for changing the directional setting of said device so as to cause said tracer to follow the contour of the pattern.

7. The pattern-controlled machine of claim 6 including means for resolving said signal into quadrature components, and means for combining the quadrature components with the feed rate voltage components to cause movement of said tracer at right angles to its direction of travel relative to said pattern.

8. In a pattern-controlled machine tool having a pair of supports mounted for transverse, coplanar movement, power means for moving each of said supports, and a tracer carried by one of said supports for cooperation with a pattern carried by the other of said supports, the combination of a finger on said tracer for contacting said pattern, means controlled by said finger for producing an electric signal whenever said tracer deviates from the pattern outline, the direction of deviation being signified by the phase of the signal and the extent of deviation by the magnitude of the signal, means for determining the direction of movement of said tracer relative to said pattern, said means including an adjustable electrical resolver and devices controlled thereby for controlling the operation of said power means, and means controlled by said signal for adjusting said resolver in a direction and to an extent corresponding to the phase and magnitude, respectively, of the signal to thereby cause said tracer to follow the contour of said pattern.

9. In an electrohydraulic tracer for following the outline of a pattern having a tracing finger adapted to bear against the surface of said pattern and follow the contour thereof, the combination of a pair of fluid-pressure motors for effecting 360 degree relative movement between said finger and said pattern, an electrically operated valve for controlling each of said motors, a source of feed rate voltage, direction controlling means for resolving the voltage from said source into sine and cosine components and applying one voltage component to each of said valves to cause said tracing finger to move relative to said pattern, means for producing an electiric signal whenever said finger deviates from the outline of said pattern, and means for resolving the signal thus produced into sine and cosine components and applying them to said valves in quadrature relation with respect to the voltage components so as to apply a correction to said tracing finger at right angles to its direction of travel along the pattern outline.

10. The electrohydraulic tracer of claim 9 including means controlled by the electric signal for adjusting the position of both of said resolving means in accordance with the extent and direction of deviation of said finger from said pattern.

11. In an electrohydraulic tracer having a pair of transversely movable supports for effecting universal relative movement between a tracing head mounted on one of said supports and a pattern mounted on the other of said supports, the combination of an individual fluid-pressure motor for operating each of said supports, a non-directional tracing finger on said head adapted to contact and be deflected from a normal position by the profiled edge of said pattern, means for producing an electric signal of one character when said finger is under-deflected by said pattern and for producing an electric signal of another character when said finger is over-deflected by said pattern, an angularly setable device for receiving the electric signal thus produced and for deriving therefrom a pair of component voltages bearing a sine and cosine relationship to the angular setting of the device, and means actuated by said component voltages for controlling the operation of said fluid pressure motors to cause the movement of said tracing head relative to said pattern to be adjusted to restore the tracing finger to its normally deflected postion.

12. The electrohydraulic tracer of claim 11 including means for correlating the angular setting of said device with the direction of travel of said tracing head relative to said pattern.

13. The electrohydraulic tracer of claim 12 wherein said correlating means also includes means controlled by the electric signal generated by said producing means for adjusting the angular setting of said device.

14. In an electrohydraulic tracing machine having a bed, a pair of transversely movable supports on said bed for effecting universal relative movement between a non-directional tracing head mounted on one of said supports and a pattern mounted on the other of said supports, the combination of a separate fluid-pressure motor for operating each of said supports on said bed, fluid-pressure and drain lines for delivering fluid to and returning fluid from each of said motors, electrically operated valve means on said bed for controlling the flow of fluid through said lines to and from said motors, a finger on said tracing head engaging with said pattern, means on said tracing head controlled by said finger for causing an electric signal to be produced whenever said tracing head fails to follow the outline of said pattern, a directional electric resolver remote from said head for receiving said signal and resolving it into a pair of component voltages, and means for applying one of said component voltages to each of said valve means to thereby control the direction of relative movement of said supports in accordance with the directional setting of said resolver.

15. The electrohydraulic tracing machine of claim 14 including power means for rotating said resolver, and means actuated by said signal for controlling the operation of said power means.

16. In a pattern-controlled machine tool having a tracer mounted for 360° movement relative to the pattern, the combination of fluid-pressure means for moving said tracer relative to said pattern, electrically actuated valve means for controlling the operation of said fluid-pressure means, a source of voltage for energizing said valve means, positionable means for resolving the voltage from said source into two components bearing a sine and cosine relationship to one another, and applying said components to said valve means to control the direction of travel of said tracer relative to said pattern, a source of power connected to said resolving means for adjusting the position thereof, and manipulative means for disconnecting said power source from said resolving means and rendering said latter means manually operable to enable hand steering of the tracer relative to the pattern.

17. In a machine tool having a pair of transversely movable supports, and a hydraulic actuator for operating each of said supports, the combination of a tracer controlled mechanism for determining the rate and direction of movement of the supports, including a non-rotatable, non-directional tracing head mounted on one of said supports, a tracing finger on said head for contacting the pattern mounted on the other of said supports, fluid-pressure lines for conducting fluid to and from the actuators, pressure differential valves for controlling the pressure in the lines to determine the direction and rate of movement of said supports, electromagnetic means for actuating said valves, a source of operating voltage, a rotatable steering device connected in circuit with said voltage source and said electromagnetic means for resolving the voltage from said source into direction modified components and applying the same to said electromagnetic means, and means for causing rotation of said steering device in response to deflections of said tracing finger.

18. The machine tool of claim 17 wherein said last-recited means includes an electric pickup controlled by the deflections of said finger, a hydraulic motor for rotating said steering device, and an electrohydraulic transducer for controlling said motor in accordance with signals produced by said pickup.

19. The machine tool of claim 18 including means on said steering device for resolving the electric signals produced by said pick-up into direction modified components, and means for applying the same to said electromagnetic means in quadrature relation to the first-mentioned components.

20. In an automatic pattern-controlled machine having a pair of transversely movable supports for effecting relative movement between a tracing head carried by one of said supports and a pattern carried by the other of said supports, the combination of a tracing finger mounted for both endwise movement and sidewise movement on said tracing head, an electrical pickup on said head for producing an "up" signal in response to endwise movement of said finger in one direction, and a "down" signal in response to endwise movement of said finger in the opposite direction, another electrical pickup on said head for producing a signal in response to sidewise deflection of said finger, means for so combining said signals as to cause the signal from the last-mentioned pickup to increase the "up" signal from the first-named pickup as the finger is deflected sidewise, power means for moving the support carrying said tracing head toward and away from the pattern, and means for controlling said power means in response to the combined signals to cause rapid removal of the tracing head away from the pattern upon sidewise deflection of said finger in conjunction with endwise movement thereof in the direction to produce an "up" signal.

21. In an automatic pattern-controlled machine having a tracing head mounted for vertical movement toward and away from a pattern, and means for moving the pattern horizontally beneath the tracing head, the combination of a tracing finger mounted on said tracing head for both axial and lateral movement, a differential transformer type of pickup on said head having an armature movable relative to the poles thereof to provide in-phase, null, and out-of-phase signals, coupling means for causing said armature to move with said finger as it is moved axially from an underdeflected position to an overdeflected position and vice-versa, a second differential transformer type of pickup on said head having an armature movable relative to the poles thereof to provide in-phase, null, and out-of-phase signals, coupling means for causing the armature of said second pickup to move with said finger as it is moved laterally from an underdeflected position to an overdeflected position and vice-versa, means for selectively combining the signals from the two pickups to produce a composite signal, and means for controlling the vertical movement of said tracing head in accordance with the phase and amplitude of said composite signal.

22. The pattern-controlled machine of claim 21 wherein the signal produced by the second-mentioned pickup when the finger is in its laterally underdeflected position is combined in additive relationship with the signal produced by the first-mentioned pickup when the finger is in its axially underdeflected position thereby requiring overdeflection of said finger in the axial direction to produce a composite signal of zero amplitude.

23. In an automatic pattern-controlled machine having a pair of transversely movable supports, a tracer on one of said supports and a pattern on the other of said supports, and actuators for moving said supports, the combination of means for controlling the speed and direction of movement of said tracer relative to said pattern including a source of operating voltage and a device for resolving the voltage into sine and cosine components, means for producing an electric control signal whenever said tracer departs from the pattern outline, and means controlled by the signal for reducing the speed of said tracer relative to said pattern when the size of the signal exceeds a predetermined value, said means including a circuit for diminishing the voltage applied to said device from said source in accordance with the extent to which the size of the signal exceeds said predetermined value.

24. The pattern-controlled machine of claim 23 wherein said reducing means includes a load resistance in circuit with said voltage source, and a variable impedance device connected across a portion of said load resistance for causing an increase in the voltage drop across the remainder of the load resistance when the size of the signal exceeds said predetermined value.

25. The pattern-controlled machine of claim 24 wherein said variable impedance device includes a grid-controlled vacuum tube.

26. The pattern-controlled machine of claim 25 wherein said reducing means also includes means for deriving a bias voltage from the control signal, and means for applying the bias voltage to the grid of said vacuum tube.

27. In a pattern controlled machine tool having a bed, a first slide mounted on said bed for rectilinear movement thereon, a second slide mounted on said bed for rectilinear movement thereon at right angles to said first slide, reversible motors for driving said slides, and a pattern carried by one of said slides and a tracer carried by the other of said slides, the combination of a non-directional tracing finger on said tracer adapted to contact said pattern and to be given a normal sidewise deflection thereby in any direction from zero to 360 degrees as the tracer moves along said pattern, means controlled by the over or under-deflection of said finger for causing an electric signal of one phase or another to be produced depending on the direction of deflection of said finger from its position of normal deflection, means including a rotatable sine-cosine resolver on said bed for controlling both of said motors to effect 360° relative movement of said supports, said device being movable from zero to 360 degrees to cause corresponding relative movement of said supports, and means controlled by said error signal for adjusting the rotational position of said resolver in accordance with the character of said signal to maintain normal deflection of said finger by said pattern.

28. Automatic reproducing apparatus comprising a pattern and a tracer supported for 360 degree relative movement, a tracing finger mounted on said tracer for engagement with said pattern, said finger being movable upon contact with said pattern from an underdeflected range through a position of normal deflection to an overdeflected range, means on said tracer controlled by said finger as it is moved by said pattern for producing a signal which varies from a signal of one character when said finger is underdeflected to a zero signal when said finger is in its position of normal deflection and to a signal of another character when said finger is overdeflected, a rotatable device movable to any angular position from zero degrees to 360 degrees, means controlled by said device for causing said tracer to move relative to said pattern in a direction corresponding to the angular position of said device, and means controlled by said signal for rotating said device in one direction when a signal of one character is produced by said finger controlled means, and in the opposite direction when a signal of the other character is produced thereby so as to return said finger to said position of normal deflection.

References Cited in the file of this patent

UNITED STATES PATENTS

| | | |
|---|---|---|
| 2,108,025 | Shaw | Feb. 8, 1938 |
| 2,116,593 | Bouvier et al. | May 10, 1938 |
| 2,500,850 | Miller | Mar. 14, 1950 |
| 2,521,185 | Parsons | Sept. 5, 1950 |
| 2,562,284 | Tancred | July 31, 1951 |
| 2,674,099 | Mason et al. | Apr. 6, 1954 |
| 2,704,012 | Trinkle | Mar. 15, 1955 |
| 2,723,845 | Przybyski et al. | Nov. 15, 1955 |